United States Patent
Choi et al.

(10) Patent No.: US 12,081,348 B2
(45) Date of Patent: Sep. 3, 2024

(54) METHOD, APPARATUS, AND SYSTEM FOR TRANSMITTING HARQ-ACK CODEBOOK IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Gyeonggi-do (KR); Geunyoung Seok, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 18/374,605

(22) Filed: Sep. 28, 2023

(65) Prior Publication Data
US 2024/0048295 A1 Feb. 8, 2024

Related U.S. Application Data

(63) Continuation of application No. PCT/KR2022/004667, filed on Mar. 31, 2022.

(30) Foreign Application Priority Data

Mar. 31, 2021 (KR) .................. 10-2021-0042384
May 20, 2021 (KR) .................. 10-2021-0064755

(51) Int. Cl.
*H04W 72/23* (2023.01)
*H04L 1/1829* (2023.01)
(Continued)

(52) U.S. Cl.
CPC .......... *H04L 1/1893* (2013.01); *H04L 1/1861* (2013.01); *H04W 72/044* (2013.01); *H04W 72/232* (2023.01)

(58) Field of Classification Search
CPC .. H04L 1/1893; H04L 1/1861; H04W 72/232; H04W 72/044; H04W 72/23
See application file for complete search history.

(56) References Cited

U.S. PATENT DOCUMENTS

2020/0313803 A1 10/2020 Khoshnevisa et al.
2021/0084647 A1* 3/2021 Takeda .................. H04L 1/1887
(Continued)

FOREIGN PATENT DOCUMENTS

CN 115118395 9/2022
EP 4 068 666 10/2022
(Continued)

OTHER PUBLICATIONS

International Search Report for PCT/KR2022/004667 dated Jul. 25, 2022 and its English translation from WIPO (now published as WO 2022/211557).
(Continued)

*Primary Examiner* — Chi Ho A Lee
(74) *Attorney, Agent, or Firm* — Ladas & Parry, LLP

(57) ABSTRACT

The present invention relates to a wireless communication system and, more particularly, to a method comprising the steps of: receiving a PDCCH for multi-slot scheduling; determining a PDSCH candidate for each slot on the basis of information in the PDCCH; and transmitting a semi-static HARQ-ACK codebook on the basis of the determined PDSCH candidate of each slot, and to an apparatus therefor.

20 Claims, 23 Drawing Sheets

(51) Int. Cl.
　　*H04L 1/1867*　　(2023.01)
　　*H04W 72/044*　　(2023.01)
　　*H04W 72/232*　　(2023.01)

(56) References Cited

U.S. PATENT DOCUMENTS

| | | | |
|---|---|---|---|
| 2021/0314094 A1* | 10/2021 | Gao | H04L 1/1896 |
| 2022/0116962 A1* | 4/2022 | Zhang | H04L 5/0044 |
| 2022/0183038 A1* | 6/2022 | Saber | H04L 1/189 |
| 2022/0209901 A1* | 6/2022 | Lei | H04L 1/1858 |
| 2022/0240187 A1* | 7/2022 | Guo | H04L 5/0053 |
| 2022/0271873 A1* | 8/2022 | Gao | H04L 1/1854 |
| 2022/0321266 A1 | 10/2022 | Awoniyi-Oteri et al. | |
| 2023/0076459 A1* | 3/2023 | Si | H04L 5/0055 |
| 2023/0135551 A1* | 5/2023 | Gao | H04W 72/0446 370/329 |
| 2023/0163900 A1 | 5/2023 | Kim et al. | |
| 2023/0209530 A1* | 6/2023 | Rastegardoost | H04L 1/1854 370/329 |
| 2023/0309090 A1* | 9/2023 | Bae | H04L 1/1822 370/329 |
| 2023/0336312 A1* | 10/2023 | Park | H04L 5/0044 |
| 2023/0361931 A1* | 11/2023 | Yang | H04L 1/18 |

FOREIGN PATENT DOCUMENTS

| | | |
|---|---|---|
| EP | 4 311 145 | 1/2024 |
| WO | 2022/211557 | 10/2022 |
| WO | 2022/212377 | 10/2022 |

OTHER PUBLICATIONS

Written Opinion of the International Searching Authority for PCT/KR2022/004667 dated Jul. 25, 2022 and its English translation by Google Translate (now published as WO 2022/211557).
Samsung: "Remaining issues on PDCCH as PDSCH SLIV reference", 3GPP TSG RAN WG1 #104-e, R1-2101177, e-Meeting, Jan. 19, 2021, pp. 1-6.
Spreadtrum Communications: "Discussion on necessity and support of Physical Layer feedback enhancements", 3GPP TSG RAN WG1 #102-e, R1-2006252, e-Meeting, Aug. 8, 2020, pp. 1-3.
Moderator (OPPO): "Summary#1 on UCI enhancements for R16 URLLC", 3GPP TSG RAN WG1 #100b-e, R1-2002695, e-Meeting, Apr. 14, 2020, pp. 1-65.
Nokia, Nokia Shanghai Bell: "Remaining details on NR-U HARQ scheduling and feedback", 3GPP TSG RAN WG1 #99, R1-1912261, Reno, USA, Nov. 8, 2019, pp. 1-20.
Extended European Search Report dated May 8, 2024 for European Patent Application No. 22781676.6.
Office Action dated Jul. 2, 2024 for Indian Patent Application No. 202327068700.
Samsung: "POSCH/PUSCH enhancements for NR from 52.6 GHz to 71 GHz", 3GPP TSG RAN WG1 #104-e, R1-2101198, e-Meeting, Jan. 19, 2021, pp. 1-9.

* cited by examiner

FIG. 5
(a)
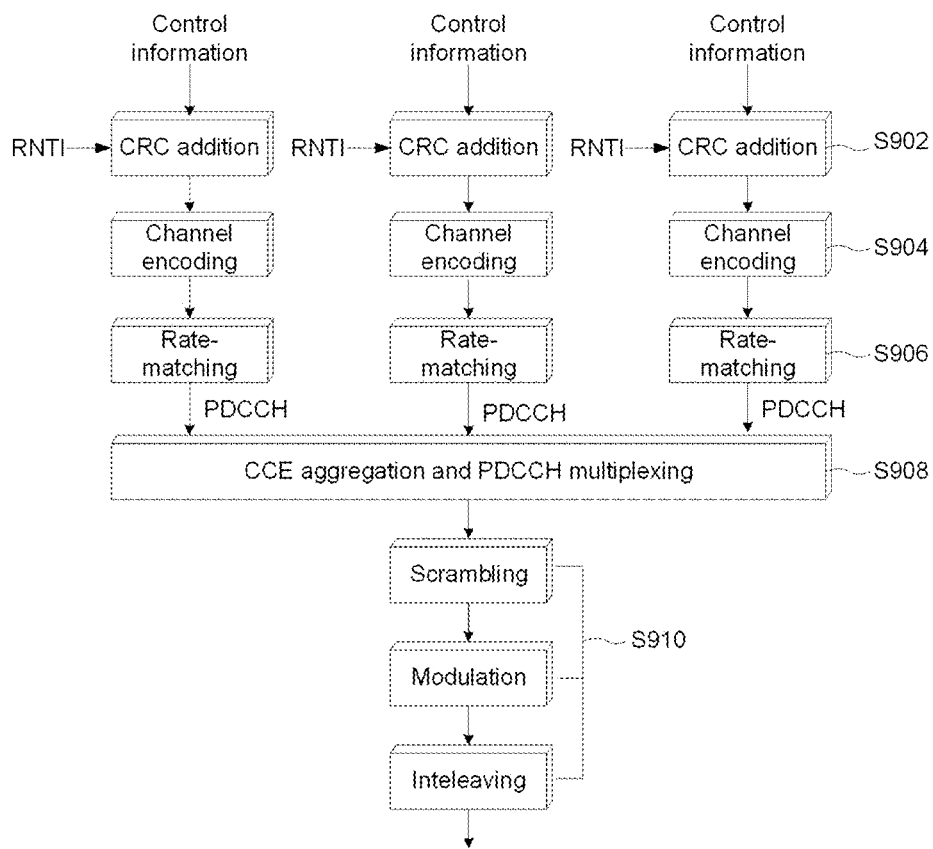
(b)
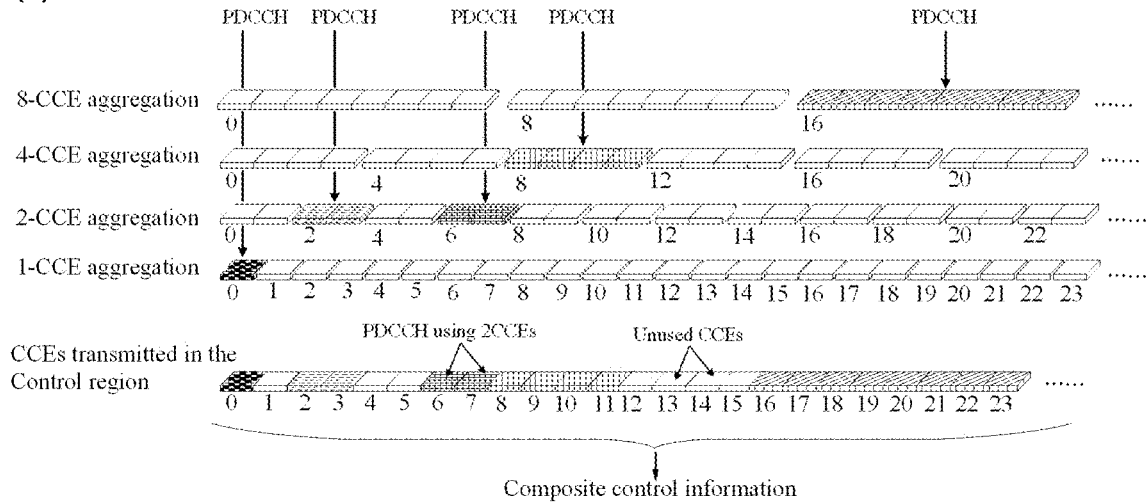

FIG. 9
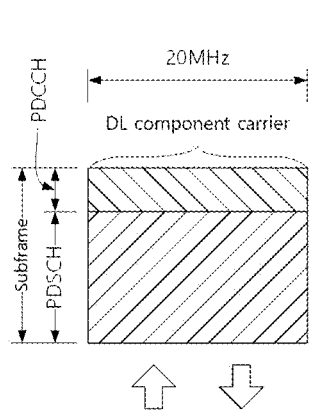
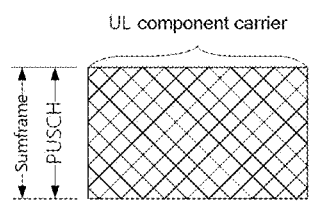
(a) Single CC
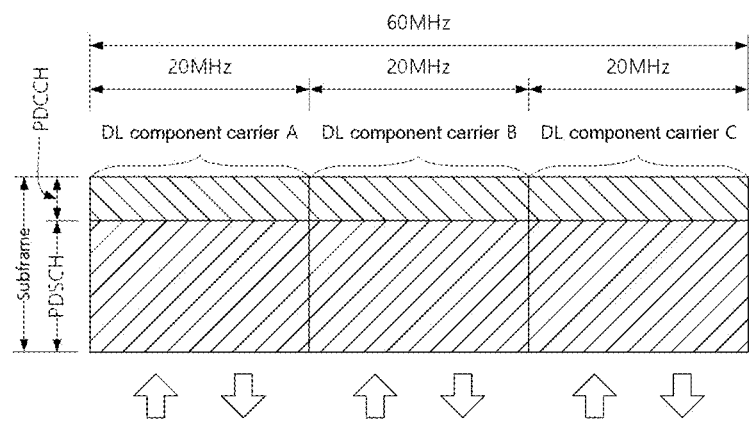
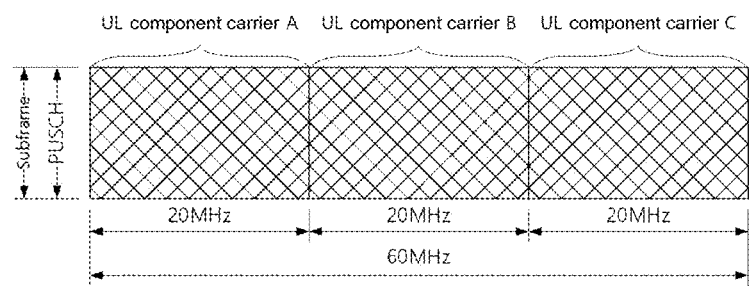
(b) Multiple CC FIG. 18
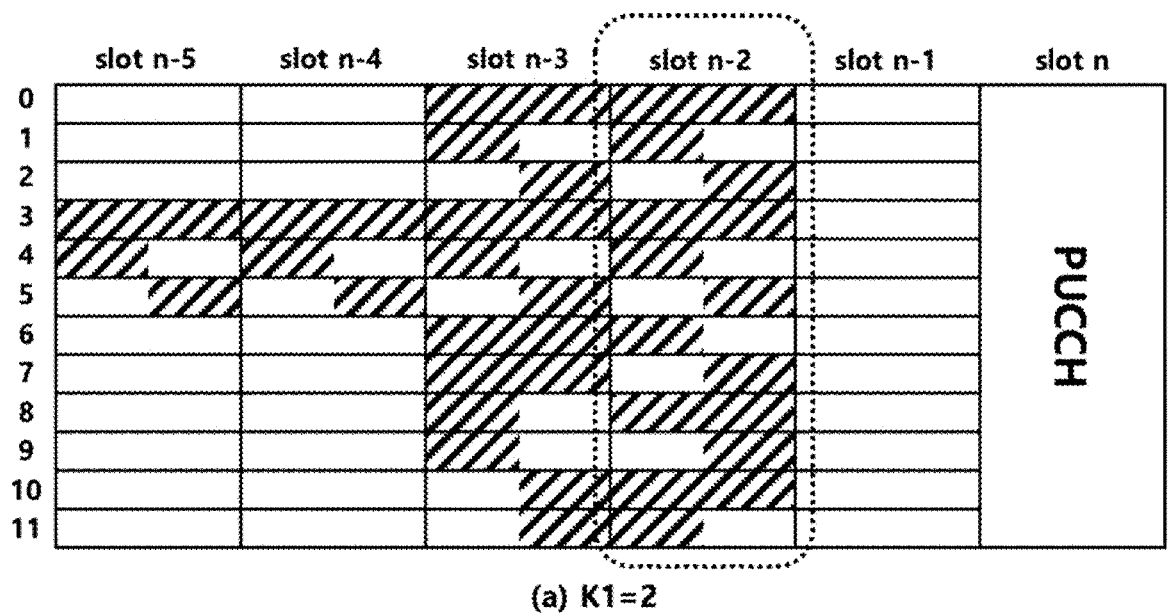
(a) K1=2
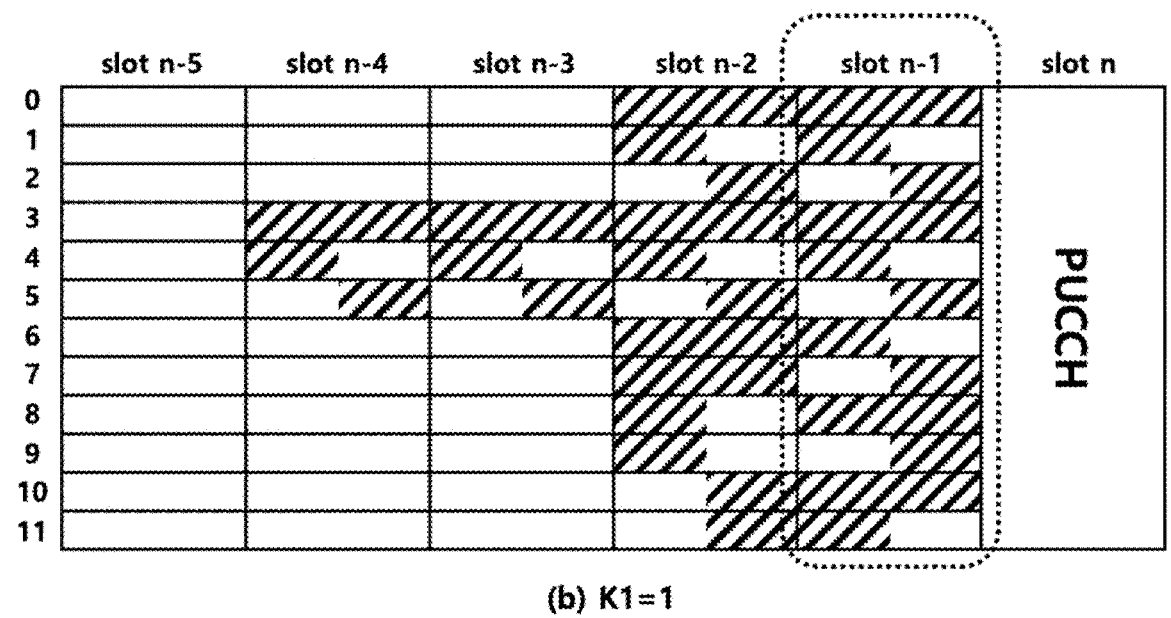
(b) K1=1

FIG. 21

METHOD, APPARATUS, AND SYSTEM FOR TRANSMITTING HARQ-ACK CODEBOOK IN WIRELESS COMMUNICATION SYSTEM

CROSS-REFERENCE TO RELATED APPLICATIONS

This application is a continuation of International Patent Application No. PCT/KR2022/004667 filed on Mar. 31, 2022, which claims the priority to Korean Patent Application No. 10-2021-0042384 filed in the Korean Intellectual Property Office on Mar. 31, 2021, and Korean Patent Application No. 10-2021-0064755 filed in the Korean Intellectual Property Office on May 20, 2021, the entire contents of which are incorporated herein by reference.

TECHNICAL FIELD

The present invention relates to a wireless communication system, and more specifically, to a method, device, and system for transmitting a HARQ-ACK codebook in a wireless communication system.

BACKGROUND ART

3GPP LTE(-A) defines uplink/downlink physical channels to transmit physical layer signals. For example, a physical uplink shared channel (PUSCH) that is a physical channel for transmitting data through an uplink, a physical uplink control channel (PUCCH) for transmitting a control signal, a physical random access channel (PRACH), and the like are defined, and there are a physical downlink shared channel (PDSCH) for transmitting data to a downlink as well as a physical control format indicator channel (PCFICH) for transmitting L1/L2 control signals, a physical downlink control channel (PDCCH), a physical hybrid ARQ indicator channel (PHICH), and the like.

The downlink control channels (PDCCH/EPDCCH) among the above channels are channels for a base station to transmit uplink/downlink scheduling allocation control information, uplink transmit power control information, and other control information to one or more user equipments. Since resources available for PDCCH that can be transmitted by a base station at one time are limited, different resources cannot be allocated to each user equipment, and control information should be transmitted to an arbitrary user equipment by sharing resources. For example, in 3GPP LTE(-A), four resource elements (REs) may be grouped to form a resource element group (REG), nine control channel elements (CCEs) may be generated, resources capable of combining and sending one or more CCEs may be notified to a user equipment, and multiple user equipments may share and use CCEs. Here, the number of combined CCEs is referred to as a CCE combination level, and a resource to which CCE is allocated according to a possible CCE combination level is referred to as a search space. The search space may include a common search space defined for each base station and a terminal-specific or UE-specific search space defined for each user equipment. A user equipment performs decoding for the number of cases of all possible CCE combinations in the search space, and may recognize whether the user equipment belongs to a PDCCH through a user equipment (UE) identifier included in the PDCCH. Therefore, such an operation of a user equipment requires a long time for decoding a PDCCH and unavoidably causes a large amount of energy consumption.

Efforts are being made to develop an improved 5G communication system or pre-5G communication system to satisfy wireless data traffic demand that is increasing after the commercialization of a 4G communication system. For this reason, a 5G communication system or pre-5G communication system is referred to as a beyond 4G network communication system or post-LTE system. It is considered to implement a 5G communication system in an ultrahigh frequency (mmWave) band (e.g., 60-GHz band) to achieve a high data transfer rate. To reduce a radio propagation path loss and increase a transfer distance of radio waves in an ultrahigh frequency band, beamforming, massive MIMO, full dimensional MIMO (FD-MIMO), array antenna, analog beamforming, and large scale antenna technologies are discussed in the field of a 5G communication system. Furthermore, to improve a network of a system, technologies such as advanced small cell, cloud radio access network (cloud RAN), ultra-dense network, device-to-device communication (D2D), wireless backhaul, moving network, cooperative communication, Coordinated Multi-Points (CoMP), interference cancellation, and the like are developed in the field of a 5G communication system. In addition, hybrid FSK and QAM modulation (FQAM) and sliding window superposition coding (SWSC), which are advanced coding modulation (ACM) schemes, and filter bank multi carrier (FBMC), nonorthogonal multiple access (NOMA), and sparse code multiple access (SCMA), which are advanced access technologies, are developed in the field of a 5G system.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Here, various attempts are made to apply a 5G communication system to an IoT network. For example, technologies such as sensor network, machine to machine (M2M), and machine type communication (MTC) are implemented with 5G communication technologies, i.e., beamforming, MIMO, array antenna, and the like. Applying a cloud radio access network (cloud RAN) as the above-described big data processing technology may be an example of convergence of 5G technology and IoT technology.

In general, a mobile communication system has been developed to provide a voice service while securing activity of a user. However, the area of a mobile communication system is expanding to not only a voice service but also a data service, and has been so developed as to provide a high-speed data service at the present time. However, in a mobile communication system which is currently being used to provide a service, a resource shortage phenomenon occurs and users require higher-speed services. Thus, a more developed wireless communication system is required.

As described above, a future 5G technology requires lower latency of data transmission with the advent of new applications such as real-time control and tactile Internet, and a required latency of 5G data is expected to be decreased to 1 ms. 5G has an objective of providing a data latency that is reduced by about 10 times compared to the prior art. To resolve such problems, a 5G communication system is expected to be proposed, which uses a mini-slot having a shorter TTI interval (e.g., 0.2 ms) in addition to an existing slot (or subframe).

DISCLOSURE OF THE INVENTION

Technical Problem

An object of the present invention is to provide a method and apparatus for efficiently transmitting and receiving signals in a wireless communication system. Further, an object of the present invention is to provide a method and apparatus for efficiently transmitting a HARQ-ACK codebook in the wireless communication system. Here, the wireless communication system can include a 3GPP-based wireless communication system, for example, a 3GPP NR-based wireless communication system.

The object of the present invention is not limited to those specifically described herein.

Technical Solution

According to an aspect of the present invention, there is provided a user equipment for use in a wireless communication system, the user equipment including a communication module; and a processor that controls the communication module, in which the processor is configured to receive a physical downlink control channel (PDCCH) having the following information:

index information indicating one entry in a time-domain resource allocation (TDRA) table for physical downlink shared channel (PDSCH) allocation, and timing information indicating one value in a K1_set $\{K1_i\}$ (i=1, 2, . . . ) for PDSCH-to-HARQ (hybrid automatic repeat and request) slot timing; determine a PDSCH candidate of slot n−$K1_i$ for all K1 values in the K1_set when slot n is indicated by the timing information; and transmit a semi-static HARQ-ACK codebook in the slot n, based on the determined PDSCH candidate of each slot, and, when determining the PDSCH candidate, the K1_set is replaced by a union of the following K-set #i based on at least one entry in the TDRA table being associated with a plurality of PDCCH-to-PDSCH slot timing K0 values, K-set #i: $\{K1_i+d_1, K1_i+d_2, \ldots, K1_i+d_N\}$, where, $d_k$ (k=1, 2, . . . , N) corresponds to a slot index difference between a last slot to which a PDSCH can be allocated and a k-th slot to which the PDSCH can be allocated based on the plurality of PDCCH-to-PDSCH timing K0 values, across all entries in the TDRA table.

According to another aspect of the present invention, there is provided a method for use by a user equipment in a wireless communication system, the method including receiving a physical downlink control channel (PDCCH) having the following information:

index information indicating one entry in a time-domain resource allocation (TDRA) table for physical downlink shared channel (PDSCH) allocation, and timing information indicating one value in a K1_set $\{K1_i\}$ (i=1, 2, . . . ) for PDSCH-to-HARQ (hybrid automatic repeat and request) slot timing; determining a PDSCH candidate of slot n−$K1_i$ for all K1 values in the K1_set when slot n is indicated by the timing information; and transmitting a semi-static HARQ-ACK codebook in the slot n, based on the determined PDSCH candidate of each slot, in which, when determining the PDSCH candidate, the K1_set is replaced by a union of the following K-set #i based on at least one entry in the TDRA table being associated with a plurality of PDCCH-to-PDSCH slot timing K0 values, K-set #i: $\{K1_i+d_1, K1_i+d_2, \ldots, K1_i+d_N\}$, where, $d_k$ (k=1, 2, . . . , N) corresponds to a slot index difference between a last slot to which a PDSCH can be allocated and a k-th slot to which the PDSCH can be allocated based on the plurality of PDCCH-to-PDSCH timing K0 values, across all entries in the TDRA table.

According to still another aspect of the present invention, there is provided a base station for use in a wireless communication system, the base station including a communication module; and a processor that controls the communication module, in which the processor is configured to transmit a physical downlink control channel (PDCCH) having the following information:

index information indicating one entry in a time-domain resource allocation (TDRA) table for physical downlink shared channel (PDSCH) allocation, and timing information indicating one value in a K1_set $\{K1_i\}$ (i=1, 2, . . . ) for PDSCH-to-HARQ (hybrid automatic repeat and request) slot timing; determine a PDSCH candidate of slot n−$K1_i$ for all K1 values in the K1_set when slot n is indicated by the timing information; and receive a semi-static HARQ-ACK codebook in the slot n, based on the determined PDSCH candidate of each slot, and, when determining the PDSCH candidate, the K1_set is replaced by a union of the following K-set #i based on at least one entry in the TDRA table being associated with a plurality of PDCCH-to-PDSCH slot timing K0 values, K-set #i: $\{K1_i+d_1, K1_i+d_2, \ldots, K1_i+d_N\}$, where, $d_k$ (k=1, 2, . . . , N) corresponds to a slot index difference between a last slot to which a PDSCH can be allocated and a k-th slot to which the PDSCH can be allocated based on the plurality of PDCCH-to-PDSCH timing K0 values, across all entries in the TDRA table.

According to still yet aspect of the present invention, there is provided a method for use by a base station in a wireless communication system, the method including transmitting a physical downlink control channel (PDCCH) having the following information:

index information indicating one entry in a time-domain resource allocation (TDRA) table for physical downlink shared channel (PDSCH) allocation, and timing information indicating one value in a K1_set $\{K1_i\}$ (i=1, 2, . . . ) for PDSCH-to-HARQ (hybrid automatic repeat and request) slot timing; determining a PDSCH candidate of slot n−$K1_i$ for all K1 values in the K1_set when slot n is indicated by the timing information; and receiving a semi-static HARQ-ACK codebook in the slot n, based on the determined PDSCH candidate of each slot, in which, when determining the PDSCH candidate, the K1_set is replaced by a union of the following K-set #i based on at least one entry in the TDRA table being associated with a plurality of PDCCH-to-PDSCH slot timing K0 values, K-set #i: $\{K1_i+d_1, K1_i+d_2, \ldots, K1_i+d_N\}$, where, $d_k$ (k=1, 2, ..., N) is corresponds to a slot index difference between a last slot to which a PDSCH can be allocated and a k-th slot to which the PDSCH can be allocated based on the plurality of PDCCH-to-PDSCH timing K0 values, across all entries in the TDRA table.

Preferably, a subcarrier spacing (SCS) applied to a slot in which the PDCCH is transmitted and the SCS applied to a slot in which the semi-static HARQ-ACK codebook is transmitted may be the same.

Preferably, as for the determined PDSCH candidates of each slot, a plurality of HARQ-ACK occasions may be sequentially allocated to PDSCH candidates that do not overlap with reference to a PDSCH candidate with an earliest last symbol, and the semi-static HARQ-ACK codebook may be configured based on the plurality of HARQ-ACK occasions.

Preferably, when a time domain bundling is applied to the semi-static HARQ-ACK codebook, the plurality of HARQ-ACK occasions may be allocated based on the PDSCH candidate of the last slot to which the PDSCH can be allocated per each bundling group based on each entry in the TDRA table.

Preferably, the wireless communication system may include a 3rd generation partnership project (3GPP) new radio (NR)-based wireless communication system.

Advantageous Effects

According to an example of the present invention, the method and apparatus for efficiently transmitting and receiving signals in the wireless communication system can be provided. Further, according to an example of the present invention, the method and apparatus for efficiently transmitting the HARQ-ACK codebook in the wireless communication system can be provided. Here, the wireless communication system can include the 3GPP-based wireless communication system, for example, a 3GPP NR-based wireless communication system.

The effects that can be obtained from the present invention are not limited to the effects mentioned above, and other effects not mentioned will be clearly understood by those skilled in the art from the description below.

BRIEF DESCRIPTION OF THE DRAWINGS

FIG. 5 illustrates a procedure for transmitting control information and a control channel in a 3GPP NR system.

FIG. 9 is a diagram for explaining single carrier communication and multiple carrier communication.

FIG. 18 illustrates PDSCH candidates corresponding to HARQ-ACK when transmitting PUCCH in slot n.

FIG. 21 illustrates a time domain bundling window.

MODE FOR CARRYING OUT THE INVENTION

Figure 1:
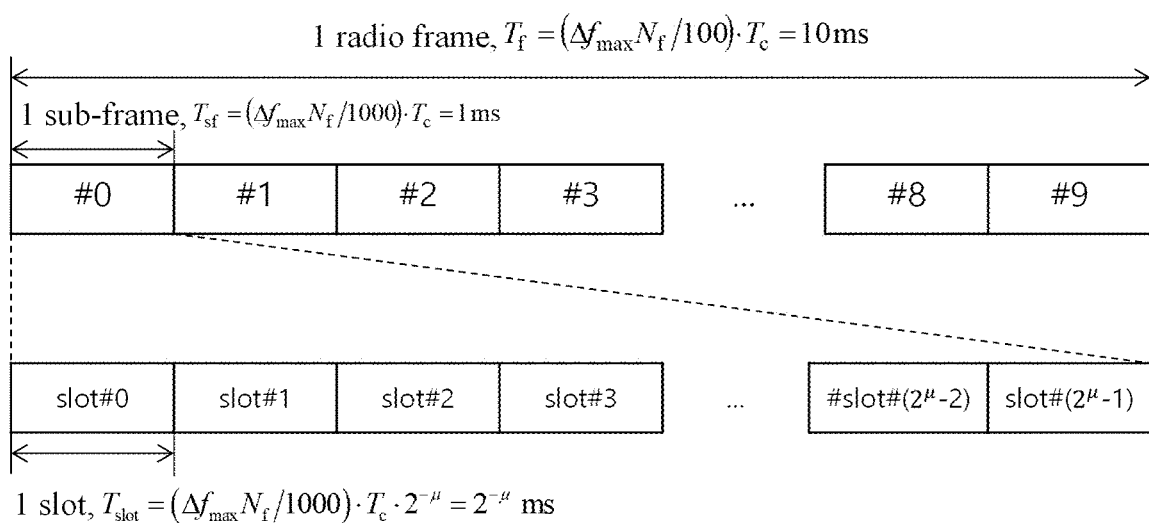
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100) * T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to 2 slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
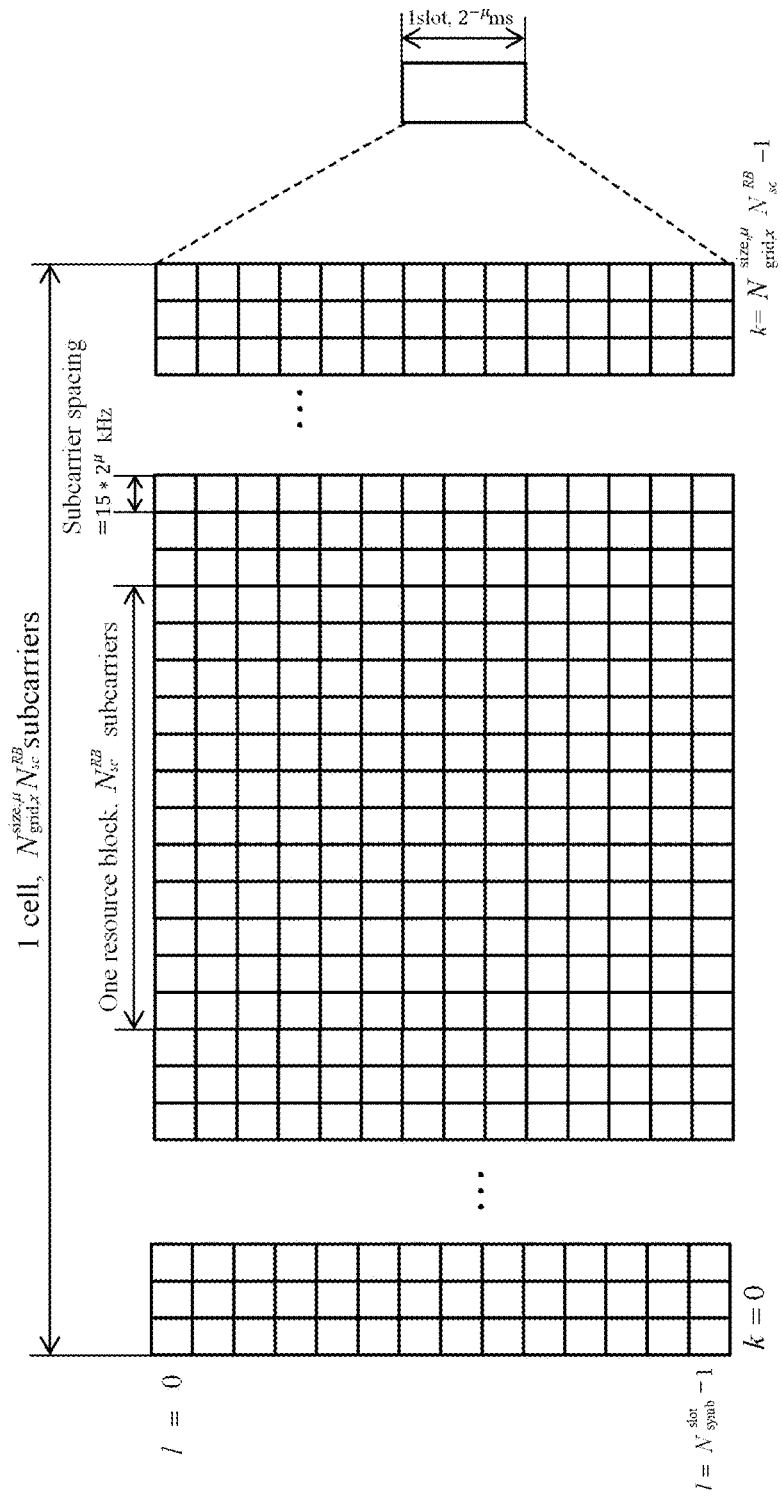
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, 1) in one slot. k may be an index assigned from 0 to $N^{size,\mu}_{grid,x} * N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | X | U | D | D | D | D | D | D | X | U |
| 47 | D | D | X | U | U | U | U | D | X | U | U | U | U | U |
| 48 | D | X | U | U | U | U | U | D | X | U | U | U | U | U |
| 49 | D | D | D | X | X | U | U | D | D | D | X | X | X | U |
| 50 | D | D | X | X | U | U | U | D | X | X | U | U | U | U |
| 51 | D | X | X | U | U | U | U | D | X | U | U | U | U | U |
| 52 | D | X | X | X | X | U | D | X | X | X | X | X | X | U |
| 53 | D | D | X | X | X | U | D | X | X | X | X | X | X | U |
| 54 | X | X | X | X | X | X | D | D | D | D | D | D | D | D |
| 55 | D | D | X | X | U | U | U | D | D | D | D | D | D | D |
| 56~255 | Reserved | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
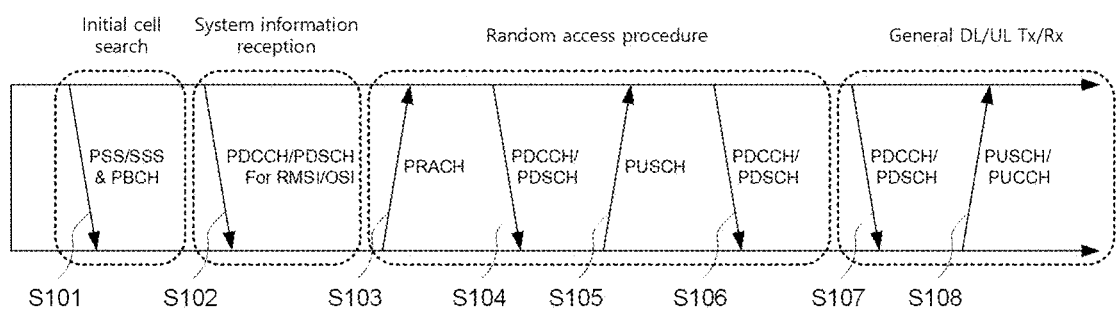
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel (PBCH) from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102).

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
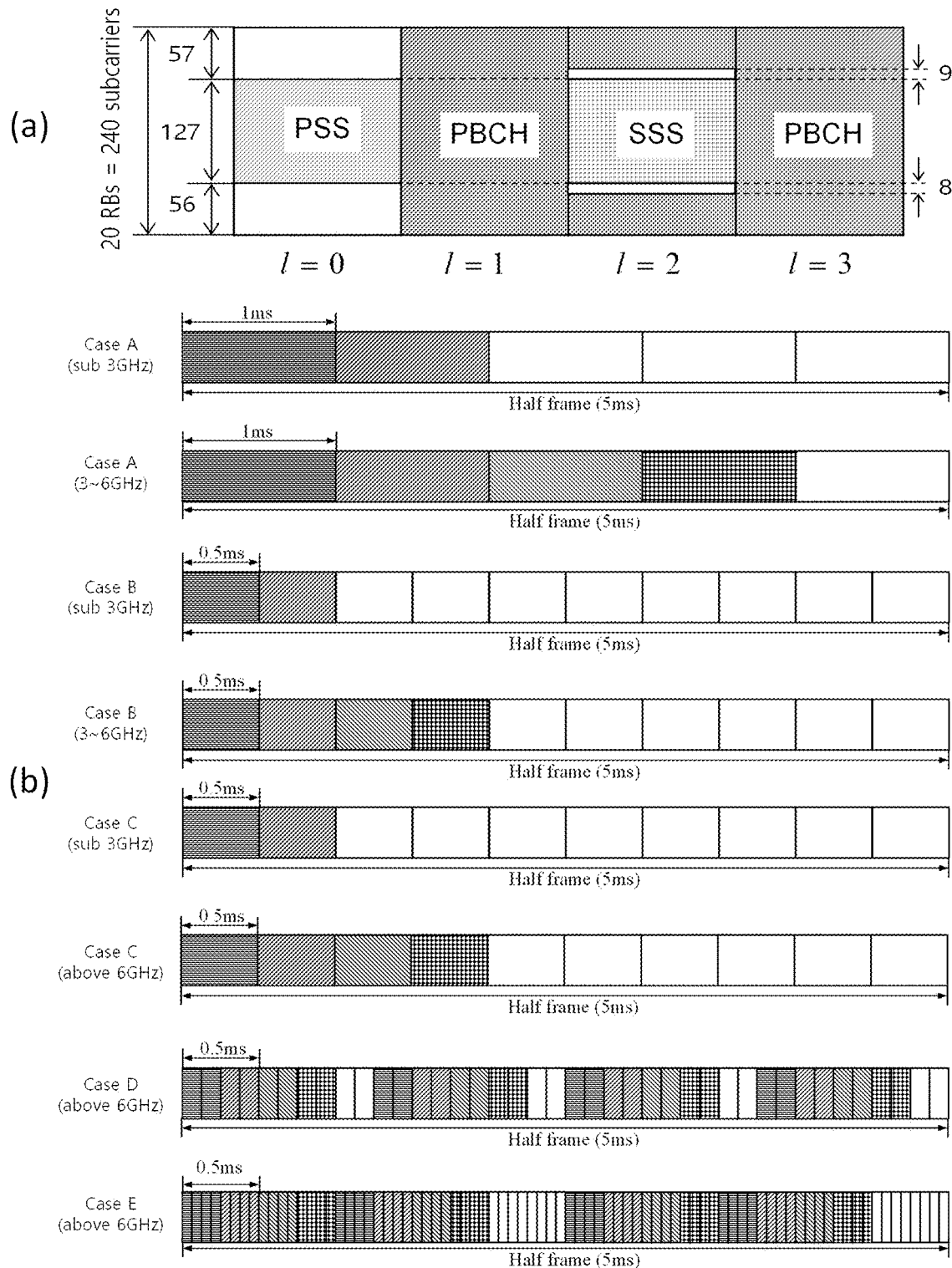
FIG. 4 illustrates an SS/PBCH block for initial cell access in a 3GPP NR system.

FIGS. 4A and 4B illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time region synchronization and/or frequency region synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number 1 relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
| PBCH | 2 | 48, 49, . . . , 55, 183, 184, . . . , 191 |
|  | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + 1, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2\times(m) \; m=(n+43N^{(2)}_{ID}) \bmod 127 \; 0 \leq n < 127$$

Here, $x(i+7)=(x(i+4)+x(i)) \bmod 2$, and $$[x(6)x(5)x(4)x(3)x(2)x(1)x(0)]=[1110110]$$

Further, the sequence $d_{SSS}(n)$ of the SSS is as follows.

$$d_{sss}(n) = [1 - 2x((n + m_0)\bmod 127][1 - 2x_1((n + m_1)\bmod 127)]$$

$$m_0 = 15\left\lfloor \frac{N^{(L)}_{ID}}{112} \right\rfloor + 5N^{(2)}_{ID}$$

$$m_1 = N^{(1)}_{ID} \bmod 112$$

$$0 \leq n < 127$$

Here, $x_0(i+7)=(x_0(i+4)+x_0(i)) \bmod 2$, and $x_1(i+7)=(x_1(i+1)+x_1(i)) \bmod 2$, $$[x_0(6)x_0(5)x_0(4)x_0(3)x_0(2)x_0(1)x_0(0)]=[0000001][x_1(6) x_1(5)x_1(4)x_1(3)x_1(2)x_1(1)x_1(0)]=[0000001]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
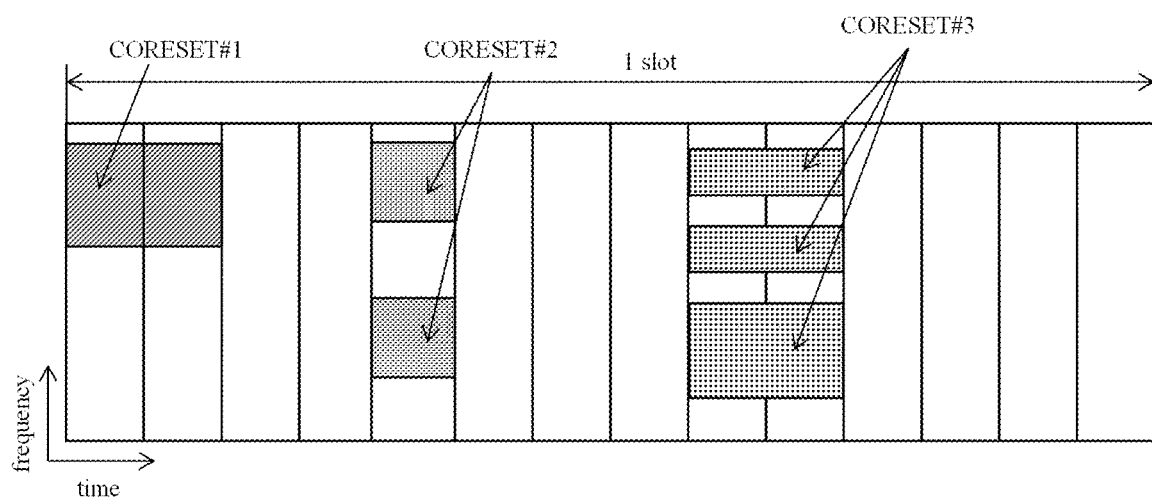
FIG. 6 illustrates a control resource set (CORESET) in which a physical downlink control channel (PDCCH) may be transmitted in a 3GPP NR system.

FIG. 6 illustrates a control resource set (CORESET) in which a physical downlink control channel (PDCCH) may be transmitted in a 3GPP NR system.

Figure 7:
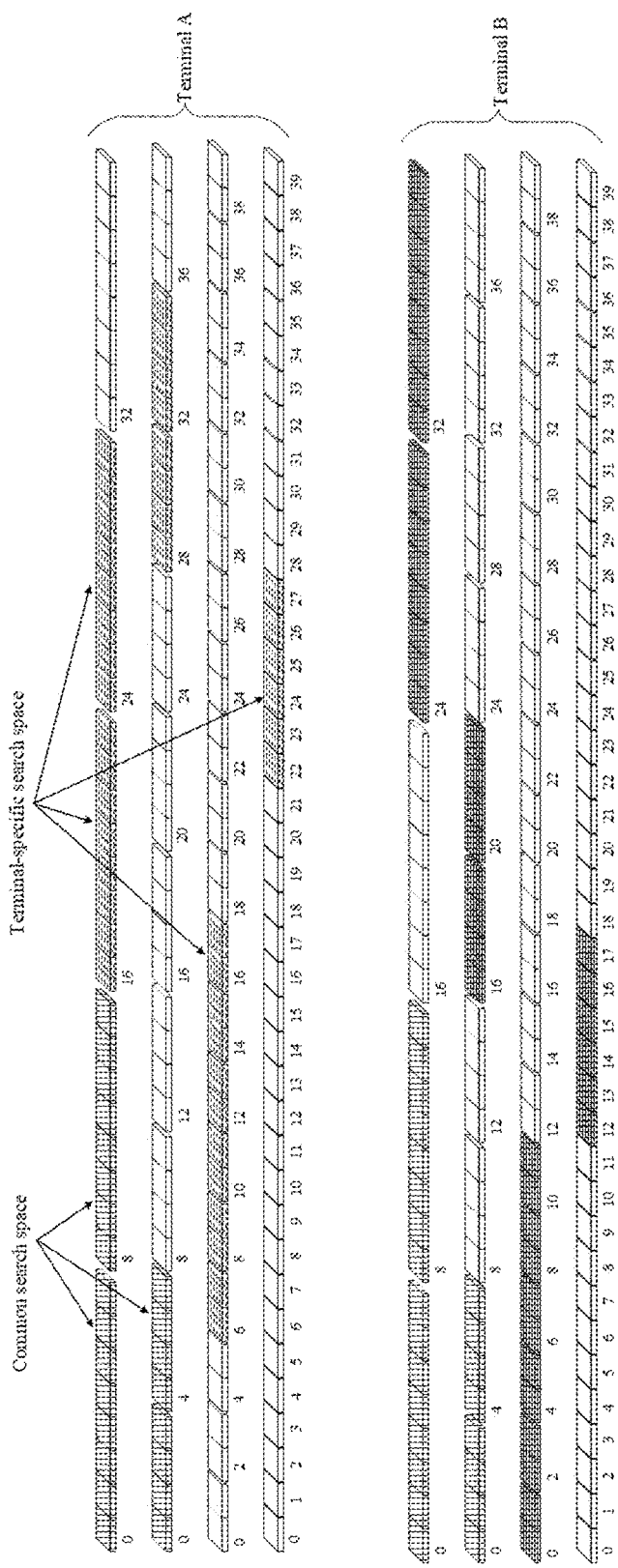
FIG. 7 illustrates a method for configuring a PDCCH search space in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency region designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a UE-specific PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this time, a sequence may be a sequence cyclic shifted from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one PRB. When the number of cyclic shifts available to the UE is 12 and $M_{bit}$=1, 1 bit UCI 0 and 1 may be represented by two cyclic shifted sequences having a difference of 6 in the cyclic shift value, respectively. In addition, when $M_{bit}$=2, 2 bit UCI 00, 01, 11, and 10 may be represented by four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence consists of a plurality of modulated complex symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs required for UCI transmission is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
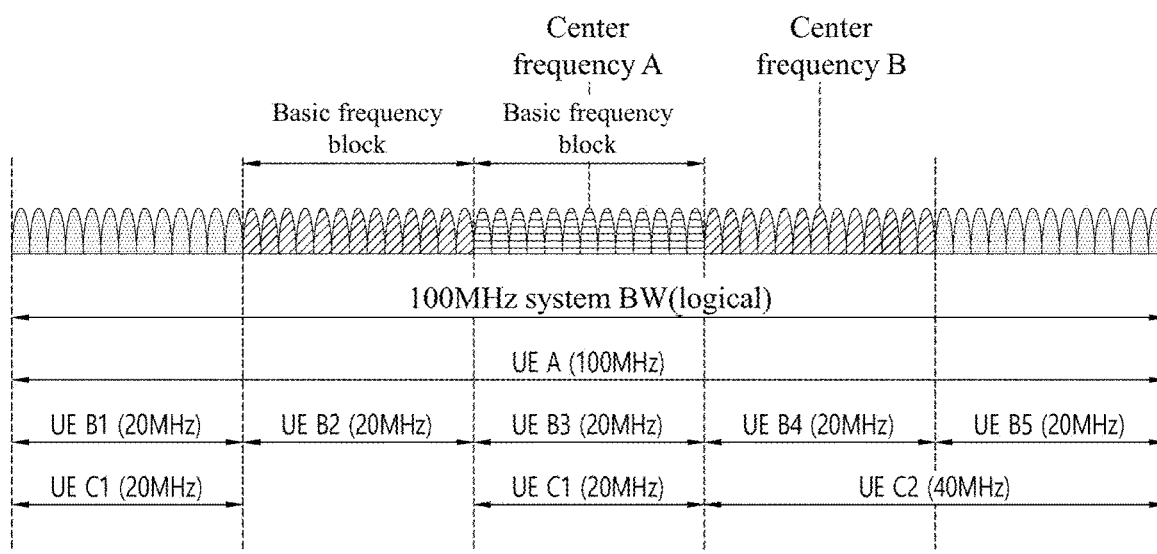
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

FIG. 9 is a drawing for explaining single carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time region, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency region. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
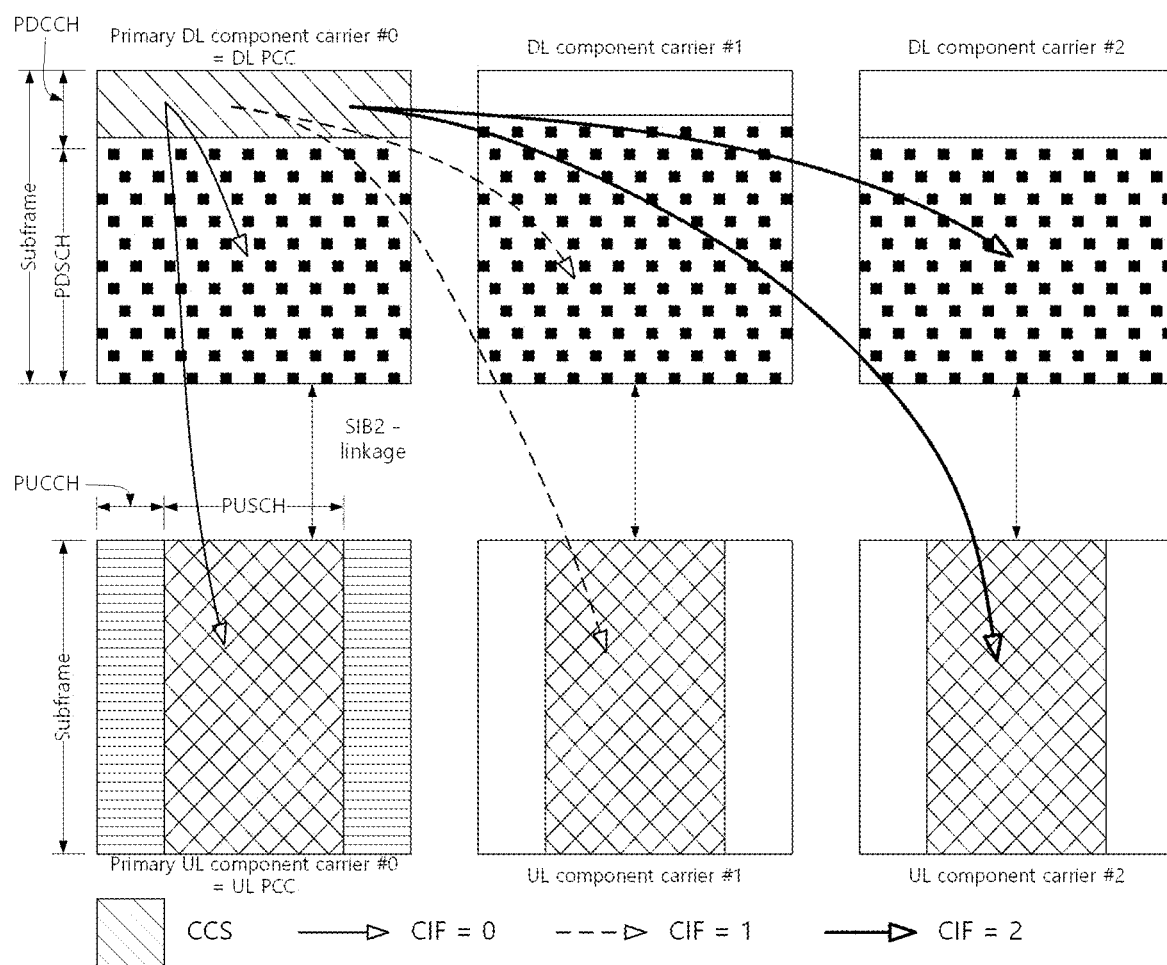
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
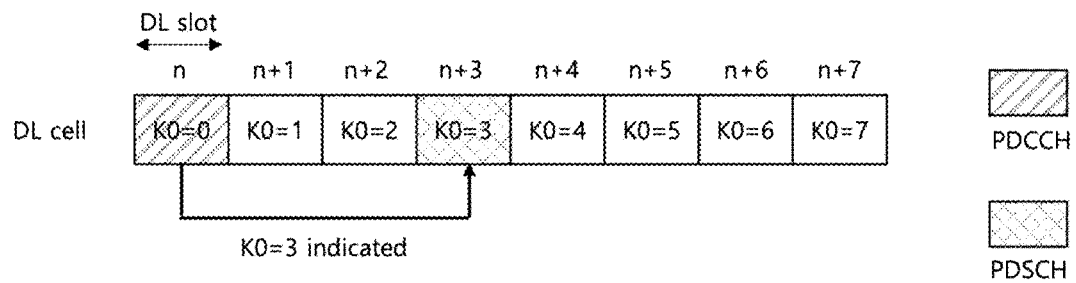
FIG. 11 illustrates scheduling of physical downlink shared channel (PDSCH).
Figure 12:
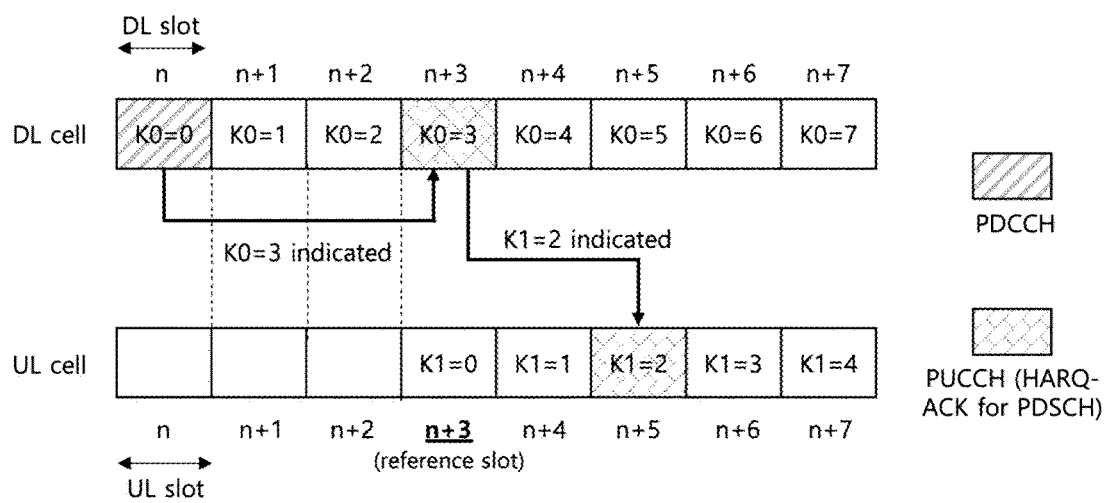
FIG. 12 illustrates scheduling of physical uplink shared channel (PUSCH).

Referring to FIGS. 11 and 12, a method of receiving PDCCH/PDSCH by a user equipment and a method of transmitting PUCCH/PUSCH by the user equipment will be described.

The user equipment can receive DCI format through PDCCH. The DCI format includes the following information.

DCI format 0_x(x=0, 1, 2): DCI format for scheduling PUSCH transmission (hereinafter, UL Grant (UG) DCI format, or UG DCI)

DCI format 1_x(x=0, 1, 2): DCI format for scheduling PDSCH reception (hereinafter, DL grant (DG) DCI format, or DG DCI)

When the user equipment receives the DCI format for scheduling the PDSCH (i.e., DG DCI format), the user equipment can receive the PDSCH scheduled by the DG DCI format. To this end, the user equipment can interpret (determine) i) the slot in which the PDSCH is scheduled and ii) the start index/length of the symbol within the slot from the DG DCI format. The time domain resource assignment (TDRA) field in the DG DCI format can indicate (i) a K0 value, which is timing information of the slot (e.g., slot offset), and (ii) a starting length indicator value (SLIV), which is the index/length of the starting symbol within the slot. Here, the K0 value can be a non-negative integer value. The SLIV can be a value obtained by jointly encoding the index S and length L values of the start symbol within the slot. Further, the SLIV can be a value in which the index S/length L values of the start symbol within the slot are separately transmitted. For example, in the case of a normal CP, S can have one of values 0, 1, . . . , 13, and L can have a value of one of natural numbers that satisfy the condition that S+L is less than or equal to 14. In the case of an extended CP, S can have one of values 0, 1, . . . , 11, and L can have a value of one of the natural numbers that satisfy the condition that S+L is less than or equal to 12.

The user equipment can determine the slot in which the PDSCH is received based on a K0 value. Specifically, based on (i) the K0 value, (ii) the index of the slot in which the DG DCI is received, (iii) the SCS of the (DL) BWP in which the DG DCI is received (i.e., SCS applied to DG DCI), and (iv) the SCS of the (DL) BWP in which the PDSCH is received (i.e., SCS applied to PDSCH), the slot in which the PDSCH is received can be determined.

As an example, it is assumed that the SCS of (i) the BWP in which DG DCI is received and the SCS of (ii) the BWP in which PDSCH is received are the same. In this case, it is assumed that the DG DCI is received in DL slot n. In this case, the PDSCH corresponding to the DG DCI is received in DL slot n+K0.

As another example, it is assumed that the SCS of the BWP in which the DG DCI is received is 15 kHz*2^mu_PDCCH, and the SCS of the BWP in which the PDSCH is received is 15 kHz*2^mu_PDSCH. In this case, it is assumed that DG DCI is received in DL slot n. Here, the index of DL slot n is an index according to the SCS of the BWP in which the DG DCI is received. In this case, the PDSCH corresponding to the DG DCI is received in DL slot floor(n*2^mu_PDSCH/2^mu_PDSCH)+K0. Here, the index of the DL slot floor(n*2^mu_PDSCH/2^mu_PDSCH)+K0 is an index according to the SCS of the BWP in which the PDSCH is received. mu_PDCCH and mu_PDSCH can have values of 0, 1, 2, and 3, respectively.

Referring to FIG. 11, it is assumed that the user equipment has received a PDCCH scheduling PDSCH in DL slot n.

Further, it is assumed that the DCI delivered through the PDCCH indicates K0=3. Further, it is assumed that (i) the SCS of the DL BWP in which the PDCCH is received (i.e., SCS applied to PDCCH; PDCCH SCS) and (ii) the SCS of the DL BWP in which the PDSCH is scheduled (i.e., SCS applied to PDSCH; PDSCH SCS) are the same. In this case, the user equipment can determine that the PDSCH is scheduled in DL slot n+K0, that is, slot n+3.

The user equipment can determine the symbol to which the PDSCH is allocated using the index S and length L values of the start symbol in the slot determined based on the K0 value. The symbols to which the PDSCH is allocated are symbol S~symbol S+L−1 in the slot determined based on the K0 value. Here, symbol S~symbol S+L−1 are L consecutive symbols.

For the user equipment, DL slot aggregation can be additionally configured from the base station. The DL slot aggregation value can be 2, 4, or 8. If the DL slot aggregation is configured, the user equipment can receive the PDSCH in consecutive slots corresponding to the slot aggregation value, starting from a slot determined based on the K0 value.

When the user equipment receives a DCI format for scheduling PUCCH (e.g., DG DCI format), the user equipment can transmit the scheduled PUCCH. Here, the PUCCH can include HARQ-ACK information. The PDSCH-to-HARQ_feedback timing indicator field included in the DG DCI format can indicate a K1 value for information on the slot in which the PUCCH is scheduled. Here, the K1 value can be a non-negative integer value. The K1 value of DCI format 1_0 can indicate one value among {0, 1, 2, 3, 4, 5, 6, 7} (hereinafter, referred to as K1_set). The K1 value of DCI formats 1_1 to 1_2 can indicate one value among K1 value(s) (i.e., K1_set) configured/set by a higher layer (e.g., RRC).

HARQ-ACK information may be two types of HARQ-ACK information on whether or not reception of channels is successful. In the first type, when the PDSCH is scheduled through DCI format 1_x, the HARQ-ACK information can be HARQ-ACK regarding whether or not reception of the PDSCH is successful. In the second type, when DCI format 1_x is a DCI indicating release of SPS PDSCH, the HARQ-ACK information can be HARQ-ACK regarding whether or not reception of DCI formats 1_0, 1_1 to 1_2 is successful.

The user equipment can determine the slot in which the PUCCH including the first type of HARQ-ACK information is transmitted as follows. The user equipment can determine (UL) slot #A that overlaps with the last symbol of the PDSCH corresponding to HARQ-ACK information. When an index of (UL) slot #A is m, an index of (UL) slot #B in which the user equipment transmits a PUCCH including HARQ-ACK information can be m+K1. Here, the index of the (UL) slot is a value according to the SCS of the UL BWP in which PUCCH is transmitted (i.e., SCS applied to PUCCH; SCS of PUCCH). Meanwhile, when the user equipment is configured with DL slot aggregation, the last symbol of the PDSCH indicates the last symbol of the PDSCH scheduled in the last slot among the slots in which the PDSCH is received.

Referring to FIG. 12, it is assumed that the user equipment has received a PDCCH scheduling PDSCH in DL slot n. Further, it is assumed that the DCI in the PDCCH indicates K0=3 and K1=2. Further, it is assumed that the SCS of the DL BWP in which the PDCCH is received (i.e., SCS of PDCCH), the SCS of the DL BWP in which the PDSCH is scheduled (i.e., SCS of PDSCH), and the SCS of the UL BWP in which the PUCCH is transmitted (i.e., SCS of PUCCH) are the same. In this case, the user equipment can determine that the PDSCH is scheduled in DL slot n+K0, that is, slot n+3. Further, the user equipment can determine a UL slot that overlaps with the last symbol of the PDSCH scheduled in DL slot n+3. Here, the last symbol of the PDSCH of DL slot n+3 overlaps with UL slot n+3. Accordingly, the user equipment can transmit PUCCH in UL slot n+3+K1, that is, slot n+5.

The user equipment can determine the slot in which PUCCH is transmitted including the second type of HARQ-ACK information as follows. The user equipment can determine UL slot #A that overlaps with an end symbol of the PDCCH corresponding to the HARQ-ACK information (e.g., PDCCH that delivers SPS release DCI). When the index of UL slot #A is m, the index of UL slot #B in which the user equipment transmits the PUCCH including the HARQ-ACK information may be m+K1. Here, the index of the UL slot is a value according to the SCS of the UL BWP in which PUCCH is transmitted (i.e., SCS of PUCCH).

Figure 13:
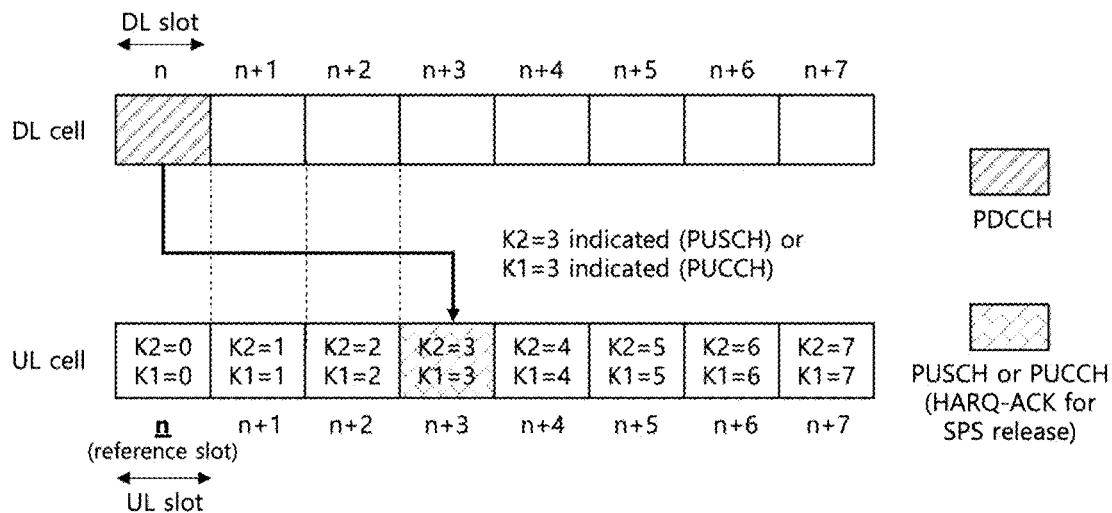
FIG. 13 illustrates scheduling of PUSCH and physical uplink control channel (PUCCH).

Referring to FIG. 13, it is assumed that the user equipment has received a PDCCH that delivers SPS PDSCH release DCI in DL slot n. It is assumed that the DCI delivered from the PDCCH indicates K1=3. Further, it is assumed that the SCS of the DL BWP in which the PDCCH is received and the SCS of the UL BWP in which the PUCCH is transmitted are the same. In this case, the user equipment can determine UL slot n that overlaps with the last symbol of the PDCCH of the DL slot n. In this case, the user equipment can determine that the PUCCH delivering HARQ-ACK for the SPS PDSCH release DCI is scheduled in UL slot n+K1, that is, UL slot n+3.

When the user equipment receives the DCI format scheduling the PUSCH (i.e., UG DCI format), the user equipment can transmit the scheduled PUSCH. To this end, the user equipment should interpret (determine) a (i) slot in which the PUSCH is scheduled and (ii) the start index and length of the symbol within the slot from the DCI. The TDRA field of the UG DCI format can indicate (i) a K2 value for information on the scheduled slot, and (ii) SLIV, which is a value for information on the index and length of the start symbol within the slot. Here, the K2 value can be a non-negative integer value. Here, SLIV can be a value obtained by jointly encoding the index S and length L values of the start symbol within the slot. Further, the SLIV can be a value in which the index S and length L values of the start symbol within a slot are separately transmitted. For example, in the case of a normal CP, S can have one of values 0, 1, . . . , 13, and L can have a value of one of natural numbers that satisfy the condition that S+L is less than or equal to 14. In the case of an extended CP, S can have one of values 0, 1, . . . , 11, and L can have a value of one of the natural numbers that satisfy the condition that S+L is less than or equal to 12.

The user equipment can determine the slot in which the PUSCH is scheduled based on the K2 value. Specifically, based on the K2 value, the index of the slot in which the UG DCI is received, and the SCS of the DL BWP in which the UG DCI is received or the SCS in the UL BWP in which the PUSCH is transmitted, the user equipment can determine the slot in which the PUSCH should be transmitted.

As an example, it is assumed that the SCS of (i) the DL BWP in which the UG DCI is received and (ii) the UL BWP in which the PUSCH is transmitted are the same. Further, it is assumed that the UG DCI is received in DL slot n. In this case, the PUSCH can be transmitted in UL slot n+K2.

As another example, it is assumed that the SCS of the DL BWP in which the UG DCI is received is 15 kHz*2^mu_PDSCH, and the SCS of the UL BWP in which the PUSCH is transmitted is 15 kHz*2^mu_PUSCH. Further, it is assumed that UG DCI is received in DL slot n. Here, the index of DL slot n is an index according to the SCS of the DL BWP in which the UG DCI is received (i.e., the SCS of the UG DCI). In this case, PUSCH can be transmitted in slot floor(n*2^mu_PUSCH/2^mu_PDSCH)+K2. Here, the slot index floor(n*2^mu_PUSCH/2^mu_PDSCH)+K2 is an index according to the SCS of the UL BWP in which the PUSCH is transmitted. In the above description, mu_PDCCH to mu_PUSCH can have values of 0, 1, 2, and 3.

Referring to FIG. 13, it is assumed that the user equipment has received a PDCCH scheduling PUSCH in DL slot n. Further, it is assumed that the DCI delivered through the PDCCH indicates K2=3. Further, it is assumed that the SCS of the DL BWP in which PDCCH is received and the SCS of the UL BWP in which PUCCH is transmitted are the same. In this case, the user equipment can determine that the PUSCH is scheduled in UL slot n+K2=n+3.

The user equipment can determine the symbol to which the PUSCH is allocated using the index S and length L values of the start symbol in the slot determined based on the K2 value. The symbols to which the PUSCH is allocated are symbol S~symbol S+L−1 in the slot determined based on the K2 value. Here, symbol S~symbol S+L−1 are L consecutive symbols.

For the user equipment, UL slot aggregation can be additionally configured from the base station. The UL slot aggregation value can be 2, 4, or 8. If the UL slot aggregation is configured, the user equipment can transmit the PDSCH in consecutive slots corresponding to the slot aggregation value, starting from a slot determined based on the K2 value.

In FIGS. 11 to 13, the user equipment uses the K0 value, K1 value, and K2 value in order to determine the slot in which the PDSCH is received, the slot in which the PUCCH is transmitted, and the slot in which the PUSCH is transmitted. For convenience, a slot obtained by assuming that the K0 value, K1 value, and K2 value are 0 is referred to as a reference point or reference slot.

In FIG. 11, the reference slot to which the K0 value is applied is DL slot n in which the PDCCH is received.

In FIG. 12, the reference slot to which the K1 value is applied is the UL slot that overlaps with the last symbol of the PDSCH, that is, UL slot n+3.

In FIG. 13, the reference slot to which the K1 value is applied is the UL slot that overlaps with the last symbol of the PDCCH, that is, UL slot n. Further, the reference slot to which the K2 value is applied is UL slot n.

For convenience, in the following description, it is assumed that the SCS of the DL BWP in which PDSCH/PDCCH are received and the SCS of the UL BWP in which PUSCH/PUCCH are transmitted are the same. Further, the UL slot and the DL slot are not separately distinguished and are expressed as the slot.

In the previous description, the user equipment receives one DCI and receives a PDSCH or transmits a PUSCH in one slot based on the DCI. However, when (only) scheduling information for one slot is provided through one DCI, in order to schedule multiple slots, the same number of DCIs as the number of slots should be transmitted. Due to this, waste of DL resources may occur.

To solve this, a method can be used in which the user equipment receives one DCI from the base station and receives PDSCH in a plurality of slots based on the DCI. Here, the PDSCH received in each slot may include different DL data (e.g., DL-SCH data). More specifically, the PDSCH received in each slot can include different transport blocks (TB). Further, the PDSCH received in each slot can have a different HARQ process number. Further, the PDSCH received in each slot can occupy a different symbol within each slot.

Further, a method can be used in which the user equipment receives one DCI from the base station and transmits PUSCH in a plurality of slots based on the DCI. Here, the PUSCH transmitted in each slot can include different UL data (e.g., UL-SCH data). More specifically, the PUSCH transmitted in each slot can include a different TB. Further, the PUSCH transmitted in each slot can have a different HARQ process number. Further, the PUSCH transmitted in each slot can occupy a different symbol within each slot.

As above, receiving PDSCH or transmitting PUSCH in a plurality of slots based on one DCI is referred to as multi-slot scheduling for convenience.

For reference, multi-slot scheduling differs from existing slot aggregation (a method of repeatedly receiving PDSCH or repeatedly transmitting PUSCH in a plurality of slots) in the following respects.

The existing slot aggregation is a method of repeatedly receiving or transmitting PDSCH or PUSCH having the same TB in a plurality of slots in order to expand coverage and improve reliability. However, the multi-slot scheduling is a method of receiving or transmitting PDSCHs or PUSCHs having different TBs in a plurality of slots in order to reduce PDCCH overhead.

In the existing DL slot aggregation, PDSCHs including the same TB are received in a plurality of slots, and thus it is determined whether or not reception of the same TB is successful from the PDSCHs received in the plurality of slots. Accordingly, the user equipment transmits HARQ-ACK for the same one TB to the base station. However, in the multi-slot scheduling, since the PDSCHs received in a plurality of slots includes different TBs, the user equipment should determine whether or not reception is successful for each TB. Further, the user equipment should transmit HARQ-ACK to the base station for each TB.

The multi-slot scheduling will be described with reference to FIGS. 14 to 16.

Figure 14:
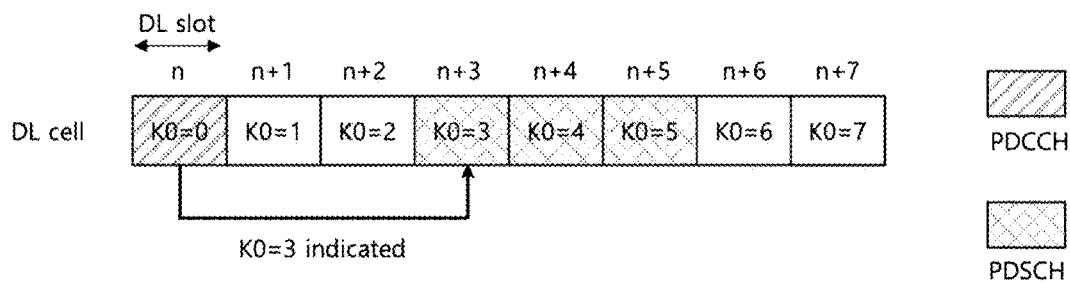
FIG. 14 illustrates scheduling of PDSCH according to multiple slot scheduling.

Referring to FIG. 14, one DCI can schedule PDSCH reception in a plurality of slots. In FIG. 14, a PDCCH including one DCI can be received in slot n. The TDRA field of the one DCI can indicate the timing information K0 value of the scheduled slot(s) and the SLIV value which is the index and length of the start symbol within each slot. More specifically, the first slot in which the PDSCH is transmitted can be determined through the K0 value. PDSCH reception can be scheduled in M consecutive slots from the first slot determined through the K0 value. In FIG. 14, K0=3 and M=3. Accordingly, PDSCH reception can be scheduled in slot n+3, slot n+4, and slot n+5. The user equipment can receive an indication of the index S of the start symbol and the number L of consecutive symbols for PDSCH reception in the slot. (S, L) can be the same or different for each slot. If (S, L) is different for each slot, the index S of the start symbol and the number of consecutive symbols (L) for reception of the PDSCH in each slot can be respectively indicated.

Table 4 shows a TDRA table used for multi-slot scheduling as an example. The TDRA table can consist of 12 entries, and entries can be indexed from 0 to 11. Here, at least one entry can be configured to schedule PDSCH in a plurality of slots. For example, each entry can schedule PDSCH in up to 4 slots. To this end, each entry can be given up to four SLIV values and K0 values. Here, the K0 value represents the difference between the slot in which the PDCCH is received and the slot in which the PDSCH is received (PDCCH-to-PDSCH slot offset). The SLIV represents the start index S of the symbol in which the PDSCH is received in one slot and the number of consecutive symbols L. In Table 4, the PDSCH scheduled in one slot can be expressed as (K0,S,L).

If PDSCHs can be scheduled in consecutive slots in multi-slot scheduling, the K0 value indicating the scheduled slot in the TDRA table can be omitted. For example, referring to Table 5, each entry in the TDRA table can include only one K0 value. And, each entry (or at least one entry) in the TDRA table can include two or more SLIV values (i.e., (S,L)). In that case, PDSCH reception can be scheduled in a symbol corresponding to the first SLIV value (first (S,L)) in a slot determined according to the K0 value, and PDSCH reception can be scheduled on a symbol corresponding to the second SLIV value (second (S,L)) in the next slot. Specifically, K0 of each entry in the TDRA table can be determined as $\{K0_r, K0_r+i, K0_r+M_r-1\}$. Here, $K0_r$ represents K0 of an r-th entry, and $M_r$ corresponds to the number of SLIV values included in the r-th entry.

If PDSCHs can be scheduled in discontinuous slots in multi-slot scheduling, the TDRA table can include (i) K0 values and (ii) offset (O) values. Here, the offset value represents the difference (slot index) between the slot indicated by the K0 value and the slot for which PDSCH reception is indicated. For example, referring to Table 6, each entry in the TDRA table can contain only one K0 value. And, each SLIV can additionally have an offset value (O in Table 6). For reference, the offset value can be omitted in SLIV for the slot indicated by the K0 value. Therefore, K0 of each entry in the TDRA table can be determined as $\{K0_r, K0_r+O_{1,r}, K0_r+O_{M-1,r}\}$. Here, $K0_r$ represents K0 of an r-th entry, and $O_{i,r}$ represents the (slot) offset value for i-th scheduling of the r-th entry. M corresponds to the number of SLIV values included in each entry.

As another example, if PDSCHs can be scheduled in discontinuous slots in multi-slot scheduling, the TDRA table can have a structure of Table 7.

TABLE 4

| Index | $(K0_1, S, L)$ | $(K0_2, S, L)$ | $(K0_3, S, L)$ | $(K0_4, S, L)$ |
|---|---|---|---|---|
| 0 | (0, 0, 14) | (1, 0, 14) | | |
| 1 | (0, 0, 7) | (1, 0, 7) | | |
| 2 | (0, 7, 7) | (1, 7, 7) | | |
| 3 | (0, 0, 14) | (1, 0, 14) | (2, 0, 14) | (3, 0, 14) |
| 4 | (0, 0, 7) | (1, 0, 7) | (2, 0, 7) | (3, 0, 7) |
| 5 | (0, 7, 7) | (1, 7, 7) | (2, 7, 7) | (3, 7, 7) |
| 6 | (0, 0, 14) | (1, 0, 14) | | |
| 7 | (0, 0, 14) | (1, 7, 7) | | |
| 8 | (0, 0, 7) | (1, 0, 14) | | |
| 9 | (0, 0, 7) | (1, 7, 7) | | |
| 10 | (0, 7, 7) | (1, 0, 14) | | |
| 11 | (0, 7, 7) | (1, 0, 7) | | |

TABLE 5

| Index | K0 | (S, L) | (S, L) | (S, L) | (S, L) |
|---|---|---|---|---|---|
| 0 | 0 | (0, 14) | (0, 14) | | |
| 1 | 0 | (0, 7) | (0, 7) | | |
| 2 | 0 | (7, 7) | (7, 7) | | |
| 3 | 0 | (0, 14) | (0, 14) | (0, 14) | (0, 14) |
| 4 | 0 | (0, 7) | (0, 7) | (0, 7) | (0, 7) |
| 5 | 0 | (7, 7) | (7, 7) | (7, 7) | (7, 7) |

TABLE 5-continued

| Index | K0 | (S, L) | (S, L) | (S, L) | (S, L) |
|---|---|---|---|---|---|
| 6 | 0 | (0, 14) | (0, 7) | | |
| 7 | 0 | (0, 14) | (7, 7) | | |
| 8 | 0 | (0, 7) | (0, 14) | | |
| 9 | 0 | (0, 7) | (7, 7) | | |
| 10 | 0 | (7, 7) | (0, 14) | | |
| 11 | 0 | (7, 7) | (0, 7) | | |

TABLE 6

| Index | K0 | (O, S, L) | (O, S, L) | (O, S, L) | (O, S, L) |
|---|---|---|---|---|---|
| 0 | 0 | (0, 0, 14) | (1, 0, 14) | | |
| 1 | 0 | (0, 0, 7) | (1, 0, 7) | | |
| 2 | 0 | (0, 7, 7) | (1, 7, 7) | | |
| 3 | 0 | (0, 0, 14) | (1, 0, 14) | (2, 0, 14) | (3, 0, 14) |
| 4 | 0 | (0, 0, 7) | (1, 0, 7) | (2, 0, 7) | (3, 0, 7) |
| 5 | 0 | (0, 7, 7) | (1, 7, 7) | (2, 7, 7) | (3, 7, 7) |
| 6 | 0 | (0, 0, 14) | (1, 0, 7) | | |
| 7 | 0 | (0, 0, 14) | (1, 7, 7) | | |
| 8 | 0 | (0, 0, 7) | (1, 0, 14) | | |
| 9 | 0 | (0, 0, 7) | (1, 7, 7) | | |
| 10 | 0 | (0, 7, 7) | (1, 0, 14) | | |
| 11 | 0 | (0, 7, 7) | (1, 0, 7) | | |

TABLE 7

| Index | $(K0_1, S, L)$ | $(K0_2, S, L)$ | $(K0_3, S, L)$ | $(K0_4, S, L)$ |
|---|---|---|---|---|
| 0 | (0, 0, 14) | | | |
| 1 | (0, 0, 7) | | | |
| 2 | (0, 7, 7) | (1, 7, 7) | | |
| 3 | (0, 0, 14) | (1, 0, 14) | (3, 0, 14) | (4, 0, 14) |
| 4 | (0, 0, 7) | (2, 0, 7) | (4, 0, 7) | (5, 0, 7) |
| 5 | (0, 7, 7) | (1, 7, 7) | (2, 7, 7) | (4, 7, 7) |
| 6 | (0, 0, 14) | (1, 0, 7) | | |
| 7 | (0, 0, 14) | (2, 7, 7) | | |
| 8 | (0, 0, 7) | (1, 0, 14) | | |
| 9 | (0, 0, 7) | (1, 7, 7) | | |
| 10 | (0, 7, 7) | (3, 0, 14) | | |
| 11 | (0, 7, 7) | (4, 0, 7) | | |

For convenience of explanation, the present invention describes a case in which PDSCHs are scheduled in a plurality of consecutive slots. Therefore, unless otherwise specified, the K0 value is omitted. However, the present invention also includes the case where PDSCHs are scheduled in a plurality of discontinuous slots (see Table 7).

Figure 15:
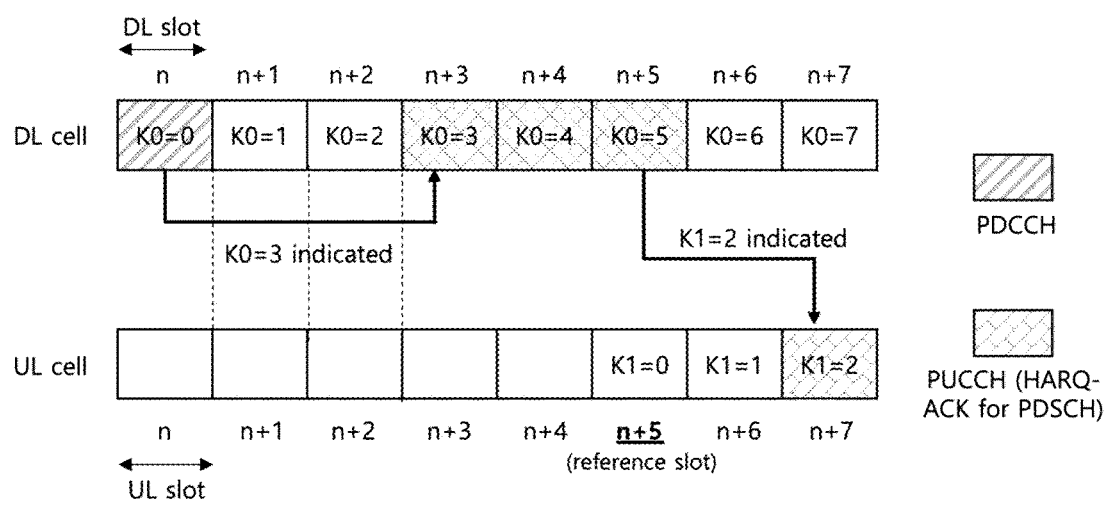
FIG. 15 illustrates PUCCH transmission in one slot according to multi-slot scheduling.

Referring to FIG. 15, HARQ-ACK of PDSCHs scheduled to be received in a plurality of slots with one DCI can be transmitted on PUCCH in one slot. Here, a UL slot that overlaps with the end point in time of the last PDSCH among the PDSCHs received in the plurality of slots can be determined as the UL slot having a K1 value of 0. In FIG. 15, UL slot n+5 is the UL slot having the K1 value of 0 and corresponds to a reference slot. The user equipment can receive an indication of one K1 value from the one DCI. In this case, HARQ-ACK of PDSCHs scheduled in multi-slot scheduling can be transmitted in the UL slot corresponding to the one K1.

Figure 16:
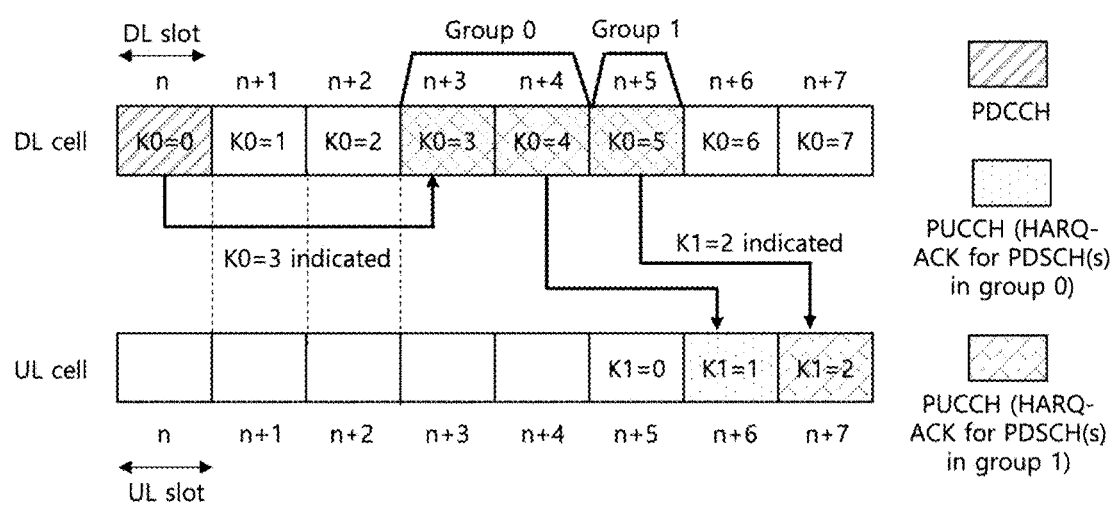
FIG. 16 illustrates PUCCH transmission in two or more slots according to multi-slot scheduling.

Referring to FIG. 16, HARQ-ACK of PDSCHs scheduled to be received in a plurality of slots with one DCI can be transmitted on PUCCH in two or more slots. The method for doing this is as follows. First, PDSCHs scheduled in multi-slot scheduling can be grouped. Here, when grouping the PDSCHs, consecutive PDSCHs in chronological order (i.e., sequentially over time) can be grouped into one group. In FIG. 16, one DCI schedules PDSCHs to be received in three slots. Among the PDSCHs in the three slots, the first two PDSCHs can be grouped into one group (Group 0), and the last one PDSCH can be grouped into one group (Group 1). The specific grouping method described above is as follows.

In the first method, the user equipment can group PDSCHs based on the number of PDSCHs scheduled with one DCI. Here, if the number of PDSCHs is greater than a certain number, a certain number of PDSCHs can be grouped to form one group. For example, if the certain number is 2 and the number of PDSCHs is 4, a group of PDSCHs can be formed by grouping two PDSCHs. Here, the certain number can be configured from the base station.

In the second method, the user equipment can group PDSCHs with one DCI based on a predetermined number of groups. That is, for the user equipment, a predetermined number of groups can be configured from the base station. For example, if the predetermined number of groups is 2 and the number of PDSCHs scheduled by one DCI is 6, the 6 PDSCHs can be divided into 2 groups. In this case, PDSCHs can be sequentially grouped into one group over time (chronological order), and the numbers of PDSCHs included in respective groups are the same as possible, but can differ by up to one.

In the third method, grouping information can be configured for each entry in TDRA. Specifically, each entry in TDRA includes information for PDSCH reception in a plurality of slots. This can include information about which slots' PDSCHs are grouped into one group. That is, along with the SLIV of each slot, the index of the group in which the SLIV is included can be included. Referring to Table 8, an index G of the group in which the SLIV is included can be included in each entry of the TDRA table. Here, SLIVs belonging to G=0 correspond to group 0, and SLIVs belonging to G=1 correspond to group 1.

TABLE 8

| Index | ($K0_1$, S, L, G) | ($K0_2$, S, L, G) | ($K0_3$, S, L, G) | ($K0_4$, S, L, G) |
|---|---|---|---|---|
| 0 | (0, 0, 14, 0) | (1, 0, 14, 0) | | |
| 1 | (0, 0, 7, 0) | (1, 0, 7, 0) | | |
| 2 | (0, 7, 7, 0) | (1, 7, 7, 0) | | |
| 3 | (0, 0, 14, 0) | (1, 0, 14, 0) | (2, 0, 14, 1) | (3, 0, 14, 1) |
| 4 | (0, 0, 7, 0) | (1, 0, 7, 0) | (2, 0, 7, 1) | (3, 0, 7, 1) |
| 5 | (0, 7, 7, 0) | (1, 7, 7, 0) | (2, 7, 7, 1) | (3, 7, 7, 1) |
| 6 | (0, 0, 14, 0) | (1, 0, 7, 0) | | |
| 7 | (0, 0, 14, 0) | (1, 7, 7, 0) | | |
| 8 | (0, 0, 7, 0) | (1, 0, 14, 0) | | |
| 9 | (0, 0, 7, 0) | (1, 7, 7, 0) | | |
| 10 | (0, 7, 7, 0) | (1, 0, 14, 0) | | |
| 11 | (0, 7, 7, 0) | (1, 0, 7, 0) | | |

The user equipment can transmit HARQ-ACK of the PDSCHs included in one group on the PUCCH of the UL slot. Here, the method of determining a UL slot includes determining a UL slot that overlaps with the end point in time of the last PDSCH included in a group as a UL slot having a K1 value of 0 (i.e., reference slot). That is, in FIG. 16, the reference slot of group 0 is slot n+4, and the reference slot of group 1 is slot n+5.

The user equipment can receive an indication of one K1 value from the one DCI. In this case, for each group, HARQ-ACK of PDSCHs scheduled to be received in a plurality of slots by the one DCI can be transmitted in the UL slot corresponding to the one K1. For example, in FIG. 16, K1=2. HARQ-ACK of two PDSCHs included in group 0 is transmitted on the PUCCH of slot n+4+2 (=reference slot index of group 0+K1), and HARQ-ACK of one PDSCH included in group 1 is transmitted on the PUCCH of slot n+7 (=reference slot index of group 1+K1).

The user equipment can receive an indication of the K1 value for each group from the one DCI. In this case, for each group, HARQ-ACK of PDSCHs scheduled to be received in a plurality of slots by one DCI can be transmitted in the UL slot corresponding to K1 of each group. For example, group 0 can be given a value of K1=1, and group 1 can be given a value of K1=2. In this case, HARQ-ACK of two PDSCHs included in group 0 is transmitted on the PUCCH of slot n+4+K1 (=reference slot index of group 0+K1 of group 0), and HARQ-ACK of one PDSCH included in group 1 is transmitted on the PUCCH of slot n+7 (=reference slot index of group 1+K1 of group 1).

Hereinafter, the present invention deals with a method of transmitting HARQ-ACK of PDSCHs when the PDSCHs are scheduled using multi-slot scheduling.

In the NR wireless communication system, the user equipment can signal whether or not reception of the DL signal/channel (requiring HARQ-ACK feedback) is successful by transmitting a codebook including HARQ-ACK information. The HARQ-ACK codebook includes one or more bits indicating whether or not reception of the DL channel/signal is successful. Here, the DL channel/signal (requiring HARQ-ACK feedback) may include at least one of i) PDSCH, ii) semi-persistence scheduling (SPS) PDSCH, and iii) PDCCH indicating SPS PDSCH release. HARQ-ACK codebook types can be divided into a semi-static HARQ-ACK codebook (or Type-1 HARQ-ACK codebook) and a dynamic HARQ-ACK codebook (or Type-2 HARQ-ACK codebook). For the equipment, the base station can configure one of two HARQ-ACK codebook types. Based on the configured HARQ-ACK codebook type, the user equipment can generate and transmit a HARQ-ACK codebook for the DL channel/signal.

Type-1 (or Semi-Static) HARQ-ACK Codebook

When a semi-static HARQ-ACK codebook is used, the base station can use the RRC signal to pre-configure the number of bits of the HARQ-ACK codebook and information (e.g., K1_set) used to determine whether each bit of the HARQ-ACK codebook relates to which DL signal/channel has been successfully received. Accordingly, the base station does not need to signal information required for HARQ-ACK codebook transmission to the user equipment every time HARQ-ACK codebook transmission is required.

Specifically, the method of generating the Type-1 HARQ-ACK codebook in existing single-slot scheduling is as follows. In single-slot scheduling, DCI schedules the PDSCH of one slot. For convenience, it is assumed that the Type-1 HARQ-ACK codebook is transmitted in slot n. Here, slot n can be determined by a value (i.e., K1) of the PDSCH-to-HARQ_feedback indicator of DCI format 1_x (PDCCH).

1) Stage 1: Let a set of K1 values that can be indicated by DCI be K1_set. In the case of DCI format 10, K1_set is {0, 1, 2, 3, 4, 5, 6, 7}. In the case of DCI formats 1_1 and 1_2, K1_set can be configured/set by a higher layer (e.g., RRC). The user equipment first takes out the largest K1 value (hereinafter K1_max) from K1_set. Thereafter, K1_max is excluded from K1_set.

2) Stage 2: Let a set of PDSCH candidates that can be received in slot n-K1_max be R. The PDSCH candidates included in the set R have start symbols and lengths within the slot according to the TDRA table. If the symbols of the PDSCH candidate included in the set R overlaps with at least one symbol with a symbol configured as UL in the semi-static UL/DL configuration, the PDSCH candidate is excluded from the set R.

3) Stage 3: The user equipment performs steps A and B for the PDSCH candidates included in R.

Step A: Among the PDSCH candidates in the set R, a new HARQ-ACK occasion is allocated to the PDSCH candidate whose last symbol is the earliest. And, if there is the PDSCH candidate(s) that overlaps with the PDSCH candidate(s) whose last symbol is the earliest by at least one symbol in the set R, the same HARQ-ACK occasion is allocated to the PDSCH candidate(s). The PDSCH candidates to which HARQ-ACK occasion is allocated (i.e., (i) the PDSCH candidate whose last symbol is the earliest and (ii) the PDSCH candidate(s) that overlaps with the PDSCH candidate by at least one symbol) are excluded from the set R.

Step B: Step A is repeated until set R becomes an empty set.

4) Stages 1), 2), and 3) are repeated until K1_set becomes an empty set.

Thereafter, the user equipment can generate the Type-1 HARQ-ACK codebook based on the allocated HARQ-ACK occasion(s). For example, when a PDSCH corresponding to HARQ-ACK occasion is received, the HARQ-ACK occasion can be configured as HARQ-ACK information of the PDSCH. However, if no PDSCH corresponding to the HARQ-ACK occasion is received, the HARQ-ACK occasion can be configured as NACK. One HARQ-ACK occasion may include one or more HARQ-ACK bits. For example, if the PDSCH includes one TB (or, if spatial bundling is configured for TBs in PDSCH), the HARQ-ACK occasion may include one HARQ-ACK bit. In addition, if the PDSCH includes two TBs (and if spatial bundling is not configured), the HARQ-ACK occasion may include two HARQ-ACK bits. In addition, when code block group (CBG)-based PDSCH reception is configured, the HARQ-ACK occasion may include HARQ-ACK bits corresponding to the maximum number of CBGs that one PDSCH can include.

Figure 17:
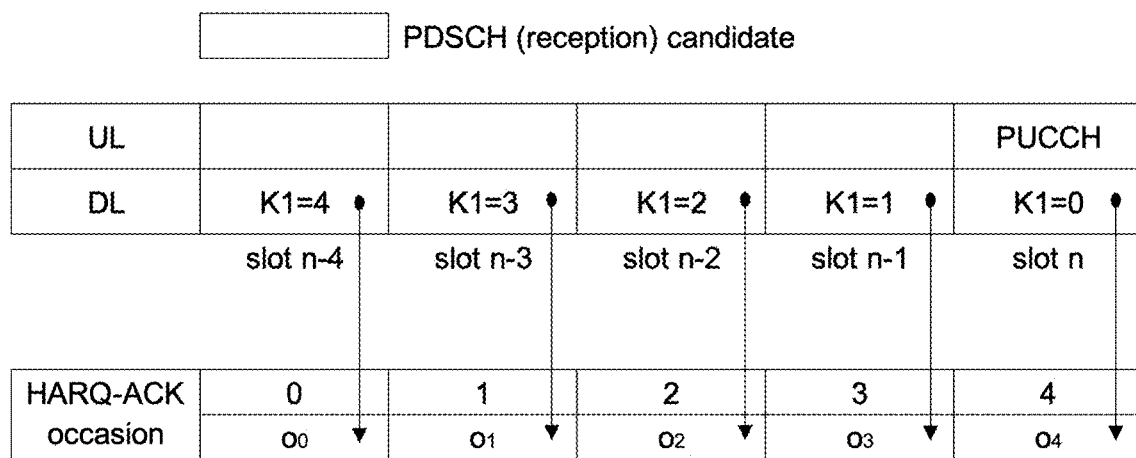
FIG. 17 illustrates the existing Type-1 hybrid automatic repeat request acknowledgment (HARQ-ACK) codebook generation method.

FIG. 17 illustrates a PDSCH candidate location and HARQ-ACK occasion in the case of K1_set={0, 1, 2, 3, 4} in existing single-slot scheduling. Referring to FIG. 17, the user equipment can determine PDSCH candidates that can be received in slot n−K1$_i$. K1$_i$ corresponds to an i-th value after sorting K1_set in descending order. Accordingly, the user equipment can determine the set R of PDSCH candidates in each slot of {slot n−4, . . . , slot n}, and allocate the HARQ-ACK occasion to the PDSCH candidate(s) of the set R. For convenience, it is assumed that one HARQ-ACK occasion is allocated to the PDSCH candidate(s) in each slot, and 1 bit per HARQ-ACK occasion is assumed. Accordingly, the Type-1 HARQ-ACK codebook consists of 5 HARQ-ACK bits (00 to 04).

Hereafter, in the present invention, 1 bit per HARQ-ACK occasion is assumed for convenience of explanation.

Meanwhile, when PDSCHs are scheduled using multi-slot scheduling, if the existing method is applied as it is, the Type-1 HARQ-ACK codebook cannot be configured correctly. For explanation, it is assumed that, for the user equipment, K1_set={1,2} is configured through RRC. Accordingly, the user equipment can receive an indication of K1=1 or K1=2 through the PDSCH-to-HARQ_feedback indicator within the DCI. If the TDRA table in Table 4 is configured, PDSCH candidates corresponding to HARQ-ACK that should be transmitted on PUCCH in slot n are shown in FIG. 18. However, the existing Type-1 HARQ-ACK codebook generation method determines the set R of PDSCH candidates that can be received in slot n−K1_max solely based on the K1 value of K1_set. Therefore, only PDSCH candidates in slot n−2 and slot n−1 can be used to generate the Type-1 HARQ-ACK codebook (see the dotted box in FIG. 18).

Hereinafter, a method of generating the Type-1 HARQ-ACK codebook when PDSCHs are scheduled using multi-slot scheduling is proposed. For further explanation, refer to Table 4 and FIG. 18. Multi-slot scheduling operation can be configured for each cell (or component carrier). Among all cells configured for the user equipment, the cell for which multi-slot scheduling is not configured can operate according to the existing single-slot scheduling method.

Proposal 1: Based on PDSCH Candidates within Slot

Proposal 1 is a method of converting multi-slot scheduled PDSCHs into PDSCH candidates for each slot and generating a Type-1 HARQ-ACK codebook using the PDSCH candidates in each slot. For example, the Type-1 HARQ-ACK codebook generation method according to Proposal 1 is as follows.

1) Stage 1: A set of K1 values that can be indicated to the user equipment is referred to as K1_set. In Proposal 1, the user equipment can determine an index of the slot in which the PDSCH candidate corresponding to the Type-1 HARQ-ACK codebook is located/received, based on the K1_set and the TDRA table. Let this set of slot indices be K_slot.

Specifically, the method of determining the K_slot is as follows. The user equipment can select one K1 value from the K1_set. Let the selected K1 value be K1_a. In this case, based on the K1_a and the TDRA table, the user equipment can determine in which slot the PDSCH can be received. For example, when the TDRA table includes PDSCH allocation information for up to N consecutive slots, based on the K1_a and the TDRA table, the user equipment can determine {slot n−K1_a−(N−1), slot n−K1_a−(N−2), . . . , slot n−K1_a} as PDSCH allocation information. Therefore, the K_slot set can include {K1_a+(N−1), K1_a+(N−2), . . . , K1_a}. For reference, the TDRA table can also include PDSCH allocation information for non-consecutive slots. Here, slot n is the slot in which the Type-1 HARQ-ACK codebook is transmitted, and N is the number of slots from the earliest scheduled slot to the latest scheduled slot, among slots scheduled in the TDRA table. Among {slot n−K1_a−(N−1) ~slot n−K1_a}, slots that are not scheduled by the TDRA table can be excluded. Finally, it is defined as K_slot (K1_a)={K1_a+(N−1), K1_a+(N−2), . . . , K1_a}. (N−i) corresponds to a slot index difference between the last slot to which a PDSCH can be allocated and the i-th slot to which a PDSCH can be allocated, based on the TDRA table. Here, the slot index difference corresponds to the difference between K0 values: e.g., (N−i)=(K0$_{max}$−K0$_i$). Here, K0$_{max}$ represents the maximum value among K0s, and K0$_i$ represents the i-th K0 value (see Table 4). K_slot (K1_a) corresponds to the union of K_slots determined for each K1_a/entry: K_slot (K1_a, r)={K1_a+(Nr−1), K1_a+(Nr−2), . . . , K1$_a$}. Here, r represents the entry index in the TDRA table, and Nr corresponds to the number of PDSCH/slot allocation information (e.g., K0, SLIV) included in the r-th entry in the TDRA table. Here, (Nr−i) can be replaced by (K0$_{max,r}$−K0$_{i,r}$). Here, K0$_{max,r}$ represents the maximum value among a plurality of K0 values corresponding to the r-th entry in the TDRA table, and K0$_i$ represents the i-th K0 value among the plurality of K0 values corresponding to the r-th entry in the TDRA table (see, Table 4).

By performing the same operation on the remaining K1 values of K1_set, the index of the slot, in which the PDSCH candidate can be received, can be obtained for all K1 values of K1_set, and the above indices can be collected/summed and included in the K_slot set.
  2) Stage 2: The largest K1 value (hereinafter K1_max) is taken out from K_slot. Thereafter, K1_max is excluded from K_slot. It corresponds to the existing stage 1, and K_slot is used instead of K1_set.
  3) Stage 3: Let the set of PDSCH candidates that can be received in slot n−K1_max be R. If the symbols of the PDSCH candidate included in the set R overlap in at least one symbol with symbol(s) configured as UL in the semi-static UL/DL configuration, the PDSCH candidate is excluded from the set R.

The PDSCH candidates included in the set R in slot n−K1_max can be obtained as follows. The user equipment can select one K1 value from K1_set. Let the selected K1 value be K1_a. Based on the value of K1_a and the TDRA table, the user equipment can determine the PDSCH candidate in the multi-slot. For example, if one entry in the TDRA table includes PDSCH allocation information for M consecutive slots, based on the K1_a and the TDRA table, the user equipment can determine {slot n−K1_a−(M−1), slot n−K1_a−(M−2), . . . , slot n−K1_a} as the PDSCH allocation information. If one slot among {n−K1_a−(M−1), slot n−K1_a−(M−2), . . . , slot n−K1_a} slots is slot n−K1_max, the PDSCH candidate included in slot n−K1_max can be included in the set R. The above process can be performed for all entries in the TDRA table, and the above process can be performed for all K1 values in K1_set.
  4) Stage 4: The user equipment performs steps A and B on the PDSCH candidates of the set R.
  Step A: A new HARQ-ACK occasion is allocated to the PDSCH candidate whose last symbol is the earliest among the PDSCH candidates in the set R. And, if there is a PDSCH candidate(s) that overlaps in at least one symbol with the PDSCH candidate whose last symbol is the earliest in the set R, the same HARQ-ACK occasion is allocated to the PDSCH candidate(s). PDSCH candidates to which the HARQ-ACK occasion is allocated (i.e., (i) the PDSCH candidate with the earliest last symbol and (ii) the PDSCH candidate(s) that overlaps with the PDSCH candidate by at least one symbol) are excluded from the set R.
  Step B: Step A is repeated until the set R becomes an empty set.
  5) Stage 5: Stages 2/3/4 are repeated until K_slot becomes an empty set.

Figure 19:
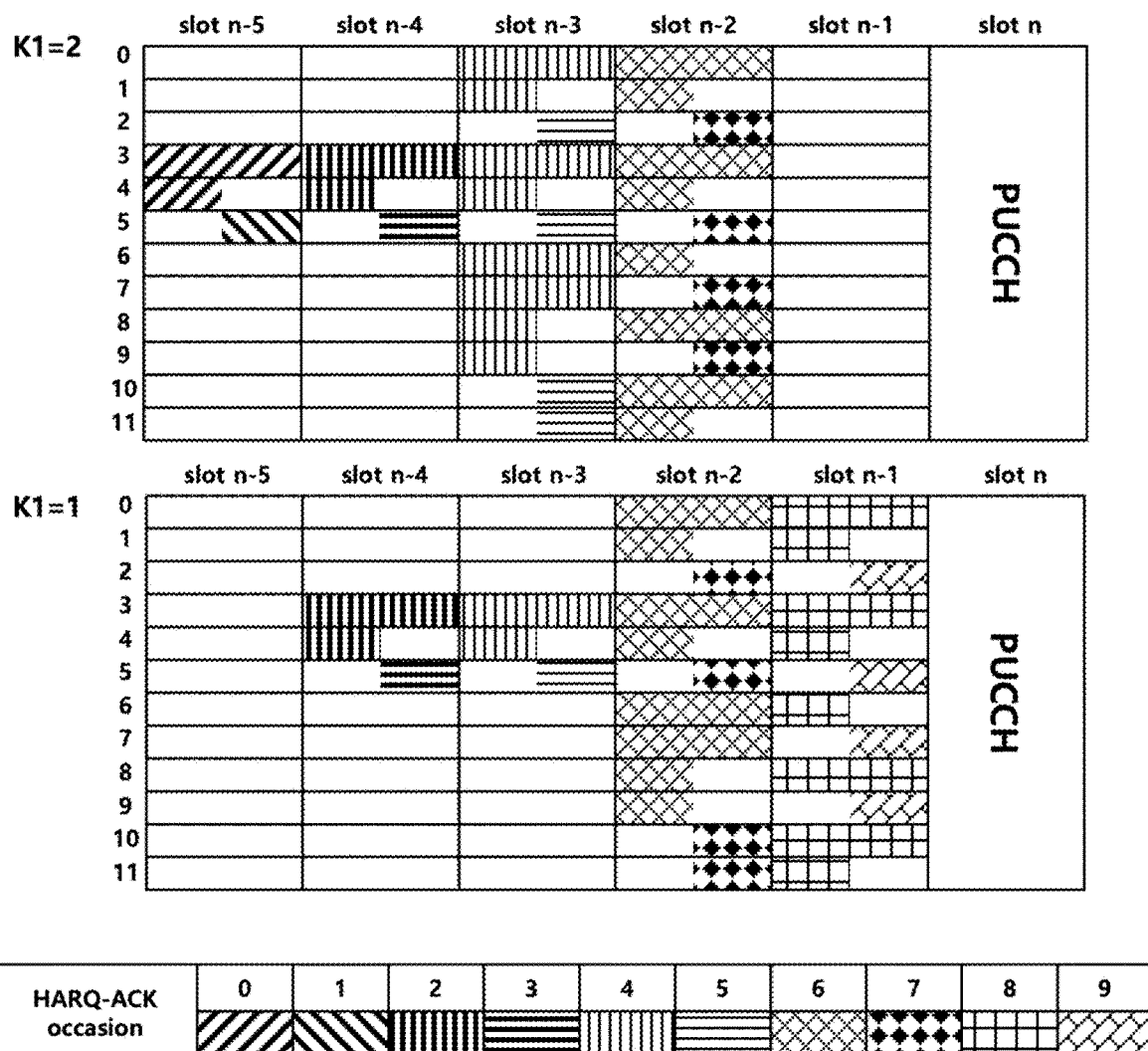
FIG. 19 is a diagram illustrating a HARQ-ACK occasion according to an example of the present invention.

Proposal 1 is explained with reference to FIG. 19.
  1) Stage 1: Since 1 and 2 are configured as K1 values (through RRC), K1_set={1,2}. The user equipment can determine K_slot through the following process.

The user equipment selects one value from K1_set. Let this be K1_a=2. Since the entry in the TDRA table includes PDSCH allocation information for up to N=4 consecutive slots, the user equipment can determine {slot n−K1_a−(N−1)=n−2−(4−1)=n−5, slot n−K1_a−(N−2)=n−2−(4−2)=n−4, slot n−K1_a−(N−3)=n−2−(4−3)=n−3, slot n−K1_a=n−2} as the PDSCH allocation information, based on K1_a=2 and the TDRA table. Therefore, K_slot (K1_a=2) includes {5, 4, 3, 2}. K_slot (K1_a=2) corresponds to the union of K_slot (K1_a=2,r).
  K_slot (K1_a=2,r=0~2): {K1_a+(Nr−1)=2+(2−1)=3, K1_a+(Nr−2)=2+(2−2)=2} or {K1_a+(K0 max,r−K01, r)=2+(1−0)=3, K1_a+(K0 max,r−K02,r)=2+(1−1)=2}
  K_slot (K1_a=2,r=3~5): {5, 4, 3, 2}
  K_slot (K1_a=2,r=6~11): {3, 2}

The user equipment selects the remaining one value from K1_set. Let this value be K1_a=1. Since the entry in the TDRA table includes PDSCH allocation information for up to N=4 consecutive slots, based on K1_a=1 and the TDRA table, the user equipment can determine {slot n−K1_a−(N−1)=n−1−(4−1)=n−4, slot n−K1_a−(N−2)=n−1−(4−2)=n−3, slot n−K1_a−(N−3)=n−1−(4−3)=n−2, slot n−K1_a=n−1} as the PDSCH allocation information. Therefore, K_slot (K1_a=1) includes {4, 3, 2, 1}. K_slot (K1_a=1) corresponds to the union of K_slot (K1_a=1,r).
  K_slot (K1_a=1,r=0~2): {K1_a+(Nr−1)=1+(2−1)=2, K1_a+(Nr−2)=1+(2−2)=1} or {K1_a+(K0 max,r−K01, r)=1+(1−0)=2, K1_a+(K0 max,r−K02,r)=1+(1−1)=1}
  K_slot (K1_a=1,r=3~5): {4, 3, 2, 1}
  K_slot (K1_a=1,r=6~11): {2, 1}

Therefore, ultimately, K_slot includes {5, 4, 3, 2, 1} (i.e., the union of K_slot (K1_a=2) and K_slot (K1_a=1)).
  2) Stage 2: K1_max=5, which is the largest value in K_slot, is selected. Thereafter, K1_max=5 is excluded from K_slot.
  3) Stage 3: Let a set of PDSCH candidates that can be received in slot n−K1_max=n−5 be R. If the symbol of the PDSCH candidate included in the set R overlaps with a symbol configured as a UL in the semi-static UL/DL configuration, the PDSCH candidate is excluded from the set R. For convenience of explanation, in this example, it is assumed that all symbols in the slot are DL symbols.

The PDSCH candidates included in the set R in slot n−5 can be obtained as follows.

The user equipment selects one value from K1_set. Let this value be K1_a=2. Entries 3, 4, and 5 of the TDRA table include PDSCH allocation information of four (M) consecutive slots, that is, {slot n−K1_a−(M−1)=n−5, slot n−K1_a−(M−2)=n−4, slot n−K1_a−(M−3)=n−3, slot n−K1_a−(M−4)=n−2}, and the remaining entries (0, 1, 2, 6, 7, 8, 9, 10, 11) include PDSCH allocation information of two consecutive slots, that is, {slot n−3, slot n−2}. Therefore, since entries 3, 4, and 5 of the TDRA table include PDSCH candidates of slot n−K1_max=n−5, the PDSCH candidate included in slot n−5 can be included in the set R. That is, the set R of PDSCH candidates that can be received in slot n−K1_max=n−5 includes the following: {(S=0, L=14), (S=0, L=7), (S=7, L=7)}. For reference, (S=0, L=14) is the PDSCH candidate of slot n−5 in entry 3 of the TDRA table, (S=0, L=7) is the PDSCH candidate of slot n−5 in entry 4 of the TDRA table, and (S=7, L=7) is the PDSCH candidate of slot n−5 in entry 5 of the TDRA table.

The remaining one value in the K1_set is selected. Let this value be K1_a=1. Entries 3, 4, and 5 of the TDRA table include PDSCH allocation information of four (M) consecutive slots, that is, {slot n−K1_a−(M−1)=n−4, slot n−K1_a−(M−2)=n−3, slot n−K1_a−(M−3)=n−2, slot n−K1_a−(M−4)=n−1}, and the remaining entries (0, 1, 2, 6, 7, 8, 9, 10, 11) include PDSCH allocation information of two consecutive slots, that is, {slot n−2, slot n−1}. Therefore, since the slots corresponding to K1_a=1 do not overlap with slot n−K1_max=n−5, there are no PDSCH candidates to be included in the set R.

Therefore, R={(S=0, L=14), (S=0, L=7), (S=7, L=7)}.
  4) Stage 4: The user equipment performs steps A and B on the PDSCH candidates of the set R.
  Step A: Among the PDSCH candidates in the set R, HARQ-ACK occasion 0 is allocated to the PDSCH candidate (S=0, L=7) whose last symbol is the earliest. And, in the set R, the same HARQ-ACK occasion is allocated to the PDSCH candidate (S=0, L=14) that overlaps with the PDSCH candidate (S=0, L=7) by at least one symbol. PDSCH candidates (S=0, L=7) and (S=0, L=14) to which the HARQ-ACK occasion is allocated are excluded from the set R. Therefore, the set R={(S=7, L=7)}

Step B: S step A is repeated until the set R becomes an empty set. In this example, since the set R is not an empty set, step A is repeated. According to step A, HARQ-ACK occasion 1 is allocated to the PDSCH candidate (S=7, L=7), and the set R becomes an empty set. Therefore, stage 4 ends.

5) Stage 5: Stages 2/3/4 are repeated until K_slot becomes an empty set. In this example, K_slot={4, 3, 2, 1}, and thus is not an empty set. Since K_slot is not an empty set, stages 2/3/4 are repeated.

According to the above stages, PDSCH candidates and HARQ-ACK occasions are determined as follows.

HARQ-ACK Occasion 0: PDSCH candidate of slot n−5 (S=0, L=7), (S=0, L=14)

HARQ-ACK Occasion 1: PDSCH candidate of slot n−5 (S=7, L=7)

HARQ-ACK Occasion 2: PDSCH candidate of slot n−4 (S=0, L=7), (S=0, L=14)

HARQ-ACK Occasion 3: PDSCH candidate of slot n−4 (S=7, L=7)

HARQ-ACK Occasion 4: PDSCH candidate of slot n−3 (S=0, L=7), (S=0, L=14)

HARQ-ACK Occasion 5: PDSCH candidate of slot n−3 (S=7, L=7)

HARQ-ACK Occasion 6: PDSCH candidate of slot n−2 (S=0, L=7), (S=0, L=14)

HARQ-ACK Occasion 7: PDSCH candidate of slot n−2 (S=7, L=7)

HARQ-ACK Occasion 8: PDSCH candidate of slot n−1 (S=0, L=7), (S=0, L=14)

HARQ-ACK Occasion 9: PDSCH candidate of slot n−1 (S=7, L=7)

Therefore, the Type-1 HARQ-ACK codebook can consist of 10 HARQ-ACK occasions.

For example, it is assumed that the DCI received by the user equipment indicates (i) entry 4 of the TDRA table and (ii) K1=2. In this case, the user equipment receives the first PDSCH (S=0, L=7) in slot n−5, receives the second PDSCH (S=0, L=7) in slot n−4, receives the third PDSCH (S=0, L=7) in slot n−3, and receives the fourth PDSCH (S=0, L=7) in slot n−2. The user equipment includes HARQ-ACK(o1) of the first PDSCH in HARQ-ACK occasion 0, incudes HARQ-ACK(o2) of the second PDSCH in HARQ-ACK occasion 2, includes HARQ-ACK(o3) of the third PDSCH in HARQ-ACK occasion 4, and includes HARQ-ACK(o4) of the fourth PDSCH in HARQ-ACK occasion 6. Therefore, the Type-1 HARQ-ACK codebook can consist of [o1 N o2 N o3 N o4 N N N]. Here, N means NACK.

In addition, it is assumed that the DCI additionally received by the user equipment indicates (i) entry 5 of the TDRA table and (ii) K1=1. In this case, the user equipment receives the fifth PDSCH (S=7, L=7) in slot n−4, receives the sixth PDSCH (S=7, L=7) in slot n−3, receives the seventh PDSCH (S=7, L=7) in slot n−2, and the eighth PDSCH (S=7, L=7) in slot n−1. The user equipment includes HARQ-ACK (o5) of the fifth PDSCH in HARQ-ACK occasion 3, includes HARQ-ACK (O6) of the sixth PDSCH in HARQ-ACK occasion 5, includes HARQ-ACK (o7) of the seventh PDSCH in HARQ-ACK occasion 7, and HARQ-ACK (08) of the eighth PDSCH in HARQ-ACK occasion 9. Therefore, the Type-1 HARQ-ACK codebook can consist of [o1 N o2 o5 o3 o6 o4 o7 N o8]. Here, N means NACK.

In Proposal 1, the HARQ-ACK occasion is created using PDSCH candidates in each slot. However, since one DCI can schedule PDSCHs in a plurality of slots, creating HARQ-ACK occasions using PDSCH candidates in each slot may be inefficient. For example, in FIG. 19, in the user equipment, up to 8 PDSCHs can be scheduled in any case. This is the case as follows:

(Entry 4 in TDRA table and K1=2, Entry 5 in TDRA table and K1=2)

(Entry 4 in TDRA table and K1=2, Entry 5 in TDRA table and K1=1)

(Entry 4 in TDRA table and K1=1, Entry 5 in TDRA table and K1=2)

(Entry 4 in TDRA table and K1=1, Entry 5 in TDRA table and K1=1)

Therefore, the Type-1 HARQ-ACK codebook transmitted by the user equipment only needs to include 8 HARQ-ACK occasions. However, according to Proposal 1, 10 HARQ-ACK occasions are included. Therefore, two HARQ-ACK occasions are not always used to transmit HARQ-ACK information.

Figure 20:
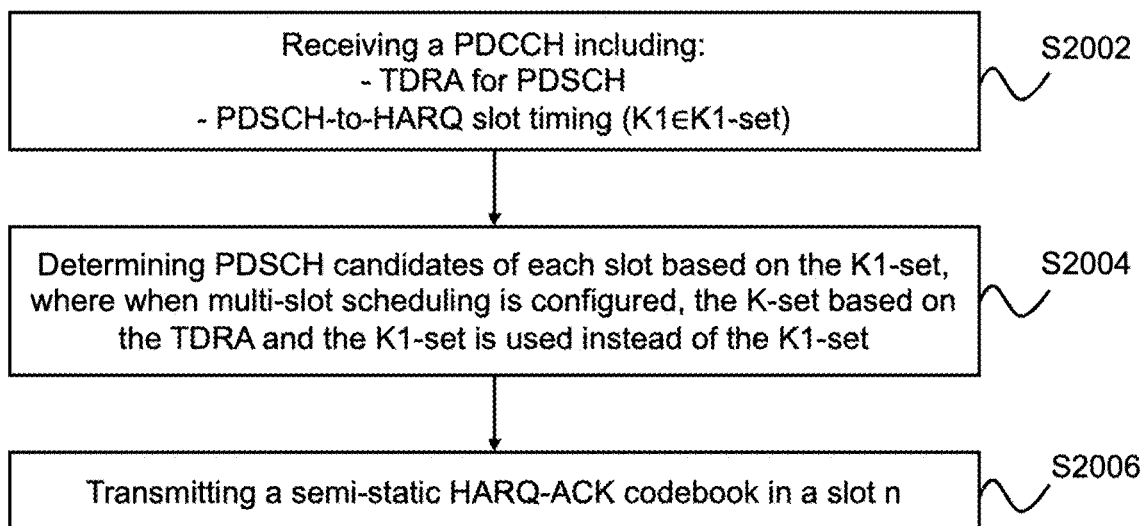
FIG. 20 illustrates a HARQ-ACK codebook generation process according to an example of the present invention.

FIG. 20 illustrates the HARQ-ACK codebook construction method according to Proposal 1.

Referring to FIG. 20, the user equipment can receive a PDCCH having the following information (S2002): (i) index information indicating one entry in the TDRA table for PDSCH allocation, and (ii) timing information indicating one value in the K1_set {K1$_i$} (i=1, 2, . . . ) for PDSCH-to-HARQ slot timing. When slot n is indicated by the timing information, the user equipment can determine a PDSCH candidate of slot n−K1$_i$ for all K1 values in the K1_set (S2004). Thereafter, the user equipment can transmit a semi-static HARQ-ACK codebook in a slot n based on the determined PDSCH candidate of each slot (S2006).

Here, when multi-slot scheduling is configured (e.g., when at least one entry in the TDRA table is associated with a plurality of PDCCH-to-PDSCH slot timing K0 values), when determining the PDSCH candidate, K1_set can be replaced by the union of the following K-set #i:

K-set #i: {K1i+d1, K1i+d2, . . . , K1i+dN}, where, $d_k$ (k=1, 2, . . . , N) corresponds to the slot index difference between the last slot to which PDSCH can be allocated and the k-th slot to which PDSCH can be allocated based on the plurality of PDCCH-to-PDSCH timing K0 values across all entries of the TDRA table.

Here, the SCS applied to the PDCCH and the SCS applied to the semi-static HARQ-ACK codebook can be the same. In addition, as for the determined PDSCH candidate of each slot, a plurality of HARQ-ACK occasions are sequentially allocated to PDSCH candidates that do not overlap with reference to a PDSCH candidate with the earliest last symbol, and the semi-static HARQ-ACK codebook can be constructed based on the plurality of HARQ-ACK occasions. In addition, when a time domain bundling described later is applied to the semi-static HARQ-ACK codebook, the plurality of HARQ-ACK occasions can be allocated based on the PDSCH candidate of the last slot to which PDSCH can be allocated per each bundling group based on each entry in the TDRA table. Additionally, the wireless communication system can include a 3GPP NR-based wireless communication system.

Proposal 2: Based on PDSCH candidates in all slots

Proposal 2 is a method of generating a Type-1 HARQ-ACK codebook using PDSCH candidates in all slots. For example, the Type-1 HARQ-ACK codebook generation method according to Proposal 2 is as follows.

1) Stage 1: The user equipment can include PDSCH candidate pairs that can be scheduled in the set R. Here, the PDSCH candidate pair is a group obtained by grouping PDSCH candidates that can be scheduled according to one entry in the TDRA table. Accordingly, the PDSCH candidate pair represents PDSCH candidates whose reception can be scheduled in a plurality of slots. And, if the symbols of the PDSCH candidate included in the PDSCH candidate pair included in the set R overlaps with a symbol configured as UL in the semi-static UL/DL configuration by at least one symbol, the PDSCH candidate is excluded from the PDSCH candidate pair. If all PDSCH candidates are excluded from a PDSCH candidate pair, the PDSCH candidate pair is excluded from the set R.

2) Stage 2: The user equipment performs steps A and B on the PDSCH candidate pairs of the set R.

Step A: One PDSCH candidate pair is taken out from the PDSCH candidate pairs of the set R. A new HARQ-ACK occasion is allocated to the PDSCH candidate pair. And, if there is a PDSCH candidate pair(s) in the set R that overlaps with the PDSCH candidate pair by at least one symbol, the same HARQ-ACK occasion is allocated to the corresponding PDSCH candidate pair(s). The PDSCH candidate pairs to which the HARQ-ACK occasion is allocated are excluded from the set R.

Step B: Step A is repeated until the set R becomes an empty set.

Unlike Proposal 1, in Proposal 2, PDSCH candidate pairs correspond to the HARQ-ACK occasion. And, each PDSCH candidate pair can include a different number of PDSCH candidates. Accordingly, the number of PDSCH candidates that one HARQ-ACK occasion should represent can be different. To this end, the number of PDSCH candidates that one HARQ-ACK occasion should represent can be determined based on the largest number of PDSCH candidates among PDSCH candidate pairs corresponding to one HARQ-ACK occasion.

In step A, the user equipment should select one PDSCH candidate pair from the set R. To this end, at least the following methods or combinations of the following methods can be considered.

In the first method, a PDSCH candidate pair including the PDSCH candidate that starts first can be selected. Through this, HARQ-ACK occasion can be preferentially allocated to PDSCH candidates at the earliest point in time.

In the second method, the PDSCH candidate pair whose end point in time is the earliest can be selected. Through this, HARQ-ACK occasion can be preferentially allocated to PDSCH candidates that end earliest in time.

In the third method, the PDSCH candidate pair having the fewest symbols can be selected. Through this, the selected PDSCH candidate pair can have the least overlap with other PDSCH candidate pairs.

In the fourth method, the PDSCH candidate pair having the most symbols can be selected. Through this, the selected PDSCH candidate pair can overlap with the largest number of PDSCH candidate pairs, and thus a large number of PDSCH candidates can be excluded from the set R.

In the fifth method, the PDSCH candidate pair having the most slots can be selected. As mentioned above, the number of PDSCH candidates that the HARQ-ACK occasion should represent is determined by the number of PDSCH candidates that the PDSCH candidate pair has. Therefore, PDSCH candidate pairs having a smaller number of overlapping slots can be found, focusing on PDSCH candidate pairs having more slots.

In the sixth method, the PDSCH candidate pair having the lowest index of the TDRA table can be selected. This can be configured when the base station configures the TDRA table.

Time Domain Bundling

When the user equipment generates the Type-1 HARQ-ACK codebook, for the user equipment, time domain bundling can be configured from the base station. Time domain bundling is a method of bundling the HARQ-ACKs of PDSCHs into one HARQ-ACK bit (e.g., binary 'AND' operation) and generating (i.e., if all of the HARQ-ACKs are ACKs, one HARQ-ACK bit is ACK, otherwise, one HARQ-ACK bit is NACK) the HARQ-ACKs as one HARQ-ACK bit, and transmitting the HARQ-ACK bit. Here, PDSCHs to which time domain bundling is applied can be PDSCHs of the same slot or PDSCHs of different slots. Here, the PDSCHs to which time domain bundling is applied are PDSCHs scheduled with one DCI, and are adjacent PDSCHs when the PDSCHs are aligned in time. For example, when the PDSCHs scheduled with one DCI are PDSCH #0 in slot n, PDSCH #1 in slot n+1, PDSCH #2 in slot n+2, and PDSCH #3 in slot n+3, among the four PDSCHs, the user equipment can bundle HARQ-ACKs of {PDSCH #0 in slot n, PDSCH #1 in slot n+1} into one HARQ-ACK bit and HARQ-ACKs of {PDSCH #2 in slot n+2, PDSCH #3 in slot n+3} into one HARQ-ACK bit. Accordingly, four HARQ-ACK bit(s) are generated for the four PDSCHs, but only two HARQ-ACK bit(s) can be transmitted through time domain bundling.

For the user equipment, at least one of the following information can be configured for time domain bundling from the base station.

As first information, the base station can configure the number of bundling HARQ-ACKs (or number of PDSCHs) for time domain bundling. Let this be $N_{bundle}$. $N_{bundle}$ can be one of values 1, 2, 4, or 8. When $N_{bundle}$ is configured for the user equipment, the user equipment bundles the HARQ-ACKs of $N_{bundle}$ PDSCHs into one HARQ-ACK bit and transmits the HARQ-ACK bit. It is assumed that M PDSCHs are scheduled with one DCI. If M is a multiple of $N_{bundle}$ (M mod $N_{bundle}$=0), the user equipment can generate one bundled HARQ-ACK by grouping $N_{bundle}$ PDSCHs and generate a total of M/$N_{bundle}$ bundled HARQ-ACKs. However, if M is not a multiple of $N_{bundle}$ (M mod $N_{bundle}$>0), the user equipment can group PDSCHs as follows. For reference, here PDSCH #0, PDSCH #1, . . . , PDSCH #(M−1) are aligned in chronological order.

In the first method, one bundled HARQ-ACK is generated by grouping $N_{bundle}$ PDSCHs in chronological order. If the number of remaining PDSCHs is less than $N_{bundle}$, one bundled HARQ-ACK is generated by grouping the remaining PDSCHs. More specifically, one bundled HARQ-ACK is generated by grouping PDSCH #0, PDSCH #1, . . . , PDSCH #($N_{bundle}$−1)}. One bundled HARQ-ACK is generated by grouping {PDSCH #($N_{bundle}$), PDSCH #($N_{bundle}$+1), . . . , PDSCH #(2*$N_{bundle}$−1)}. Continue grouping like this, and one bundled HARQ-ACK is generated by grouping {PDSCH #(floor(M/$N_{bundle}$)*$N_{bundle}$), PDSCH #(floor(M/$N_{bundle}$)*$N_{bundle}$+1), . . . ,PDSCH #(M−1)}. As a result, a total of ceil(M/$N_{bundle}$) bundled HARQ-ACK bit(s) is generated.

In the second method, K=ceil(M/$N_{bundle}$) groups can be generated by grouping PDSCHs in chronological order. The number of PDSCHs included in each group can be ceil (M/K) PDSCHs or floor (M/K) PDSCHs. M mod K groups can be generated by grouping ceil (M/K) PDSCHs in chronological order, and K−(M mod K) groups can be generated by grouping floor(M/K) PDSCHs in subsequent chronological order. One bundled HARQ-ACK can be generated by bundling the HARQ-ACKs in the group. As a result, a total of ceil (M/$N_{bundle}$) bundled HARQ-ACK bit(s) is generated.

As second information, the base station can configure the number of bundled HARQ-ACKs (or the number of PDSCH/bundling groups) for time domain bundling. Let this be $N_{group}$. $N_{group}$ can be one value of 1, 2, 4, or 8. When $N_{group}$ is configured for the user equipment, the user equipment can generate $N_{group}$ PDSCH groups by grouping M PDSCHs. For reference, if M is smaller than $N_{group}$, M PDSCH groups are generated by grouping one PDSCH, and the next $N_{group}$–M groups do not include a PDSCH. HARQ-ACK of a group that does not include a PDSCH can be configured as NACK. HARQ-ACK of the group that does not include the PDSCH may not be transmitted to the base station.

In the first method, one bundled HARQ-ACK can be generated by grouping K=ceil (M/$N_{group}$) PDSCHs in chronological order. If the number of remaining PDSCHs is less than K, one bundled HARQ-ACK can be generated by grouping the remaining PDSCHs. For example, one bundled HARQ-ACK can be generated by grouping {PDSCH #0, PDSCH #1, . . . , PDSCH #(K–1)}, and one bundled HARQ-ACK can be generated by grouping {PDSCH #(K), PDSCH #(K+1), . . . , PDSCH #(2*K–1)}. Continue grouping like this, and one bundled HARQ-ACK can be generated by grouping {PDSCH #(floor(M/K)*K), PDSCH #(floor(M/K)*K+1), . . . ,PDSCH #(M–1)}. As a result, a total of $N_{group}$ bundled HARQ-ACK bit(s) can be generated.

In the second method, $N_{group}$ groups can be generated by grouping PDSCHs in chronological order. The number of PDSCHs included in each group can be ceil (M/$N_{group}$) or floor (M/$N_{group}$) PDSCHs. M mod $N_{group}$ groups can be generated by grouping ceil(M/$N_{group}$) PDSCHs in chronological order, and $N_{group}$–(M mod $N_{group}$) groups can be generated by grouping floor(M/$N_{group}$) PDSCHs in subsequent chronological order. One bundled HARQ-ACK can be generated by bundling HARQ-ACKs within a group. As a result, a total of $N_{group}$ bundled HARQ-ACK bit(s) are generated.

As third information, the base station can configure a time interval for time domain bundling. The time interval can be configured in slot units. The time interval can be referred to as a bundling window. Let the time interval configured in slot units be $N_{slot}$. The user equipment can generate one group by grouping the PDSCHs included in $N_{slot}$ slots. If there is at least one PDSCH included in the group, the user equipment can bundle the HARQ-ACKs of the PDSCHs into one HARQ-ACK. HARQ-ACK of a group that does not include a PDSCH can be configured as NACK. Further, the HARQ-ACK of the group that does not include a PDSCH may not be transmitted to the base station. The user equipment can determine the $N_{slot}$ slots as follows.

In the first method, the user equipment can generate a group by grouping the PDSCHs included in the slots, for each $N_{slot}$ consecutive slots starting from slot 0 of the frame. That is, a group can be generated by grouping the PDSCHs included in slot i*$N_{slot}$, slot i*$N_{slot}$+1, . . . , slot (i+1)*$N_{slot}$–1. Here, i is an integer.

In the second method, the user equipment can generate a group by grouping the PDSCHs included in the slots, for each $N_{slot}$ consecutive slots starting from slot k of the frame. That is, a group can be generated by grouping the PDSCHs included in slot i*$N_{slot}$+k, slot i*$N_{slot}$+k+1, . . . , slot (i+1)*$N_{slot}$–1+k. For reference, one group can be generated by grouping the PDSCHs included in slot 0, slot 1, . . . , slot k–1. Here, i is an integer. Here, k may be a value configured for the user equipment by the base station, or a value determined based on the index of the slot in which the first PDSCH is scheduled, or a value determined based on the index of the slot in which the PDCCH scheduling the PDSCH is transmitted, or a value determined based on the index of the slot in which the PUCCH including the HARQ-ACK of the PDSCH is transmitted. k is an integer and corresponds to a slot offset.

For example, if X is the value determined based on the index of the slot in which the first PDSCH is scheduled, it may be k=X. Since the first PDSCH is scheduled in slot 3, the PDSCHs included in $N_{slot}$=4 slots starting from slot 3, that is, slot 3, slot 4, slot 5, and slot 6, can be grouped into one group, and the PDSCHs included in the next $N_{slot}$=4 slots, that is, slot 7, slot 8, slot 9, and slot 10, can be grouped into one group. k is an integer and corresponds to the slot offset.

For example, if X is the value determined based on the index of the slot in which the PDCCH scheduling PDSCHs is transmitted, it may be k=X. Since the first PDSCH is scheduled in slot 1, the PDSCHs included in $N_{slot}$=4 slots starting from slot 1, that is, slot 1, slot 2, slot 3, and slot 4, can be grouped into one group, and the PDSCHs included in the next $N_{slot}$=4 slots, that is, slot 5, slot 6, slot 7, and slot 8, can be grouped into one group.

For example, if the index of the slot in which PUCCH including HARQ-ACK of PDSCH is transmitted is X, it may be k=X mod $N_{slot}$. Since PUCCH is scheduled in slot 10, k=10 mod 4=2. Therefore, the PDSCHs included in $N_{slot}$=4 slots starting from slot 2, that is, slot 2, slot 3, slot 4, and slot 5, can be grouped into one group, and the next $N_{slot}$=4 slots, that is, slot 6, slot 7, slot 8, and slot 9, can be grouped into one group.

Figure 21:
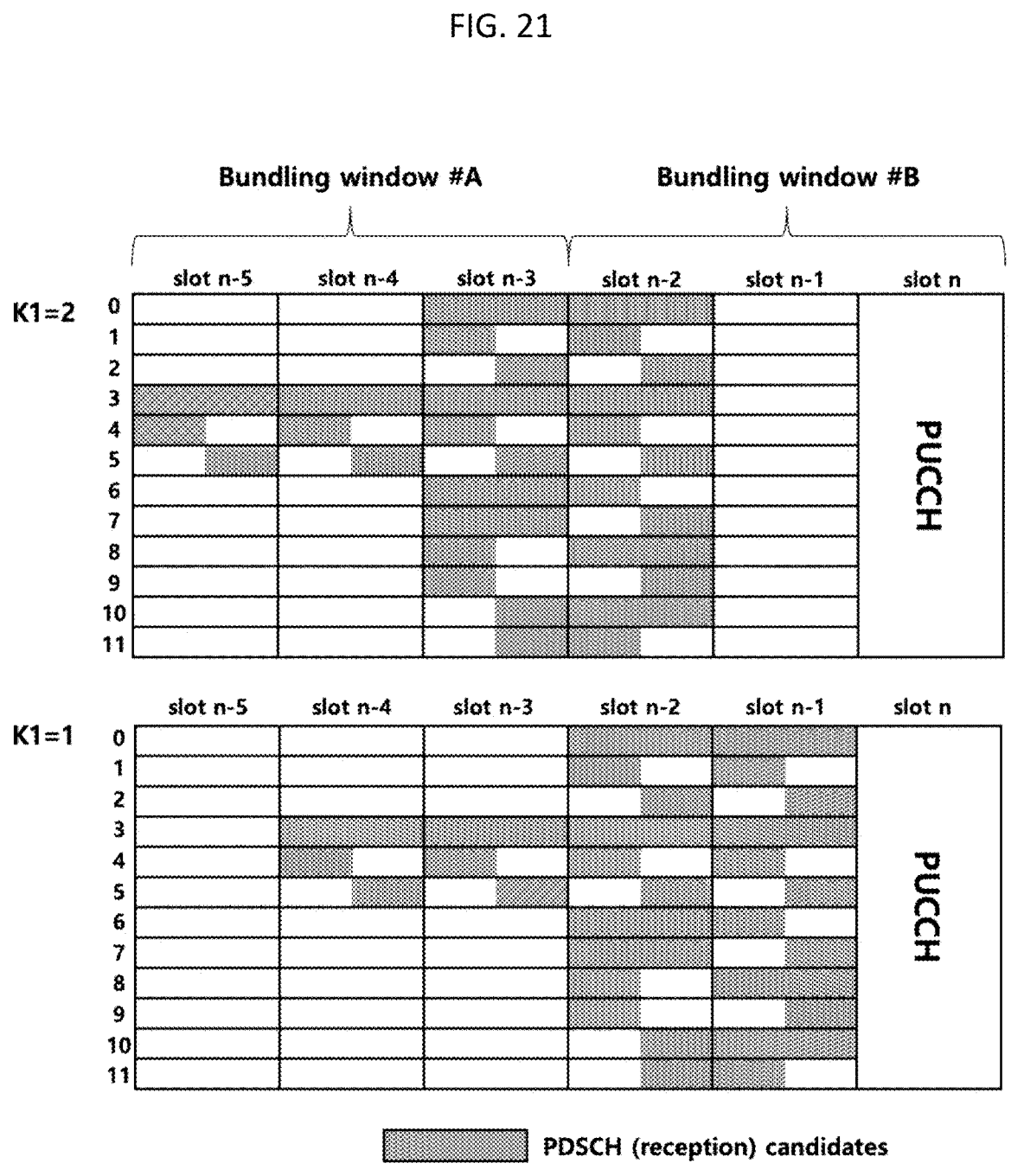

Referring to FIG. 21, it is assumed that $N_{slot}$=3 is configured for the user equipment. Here, k=n–5. That is, a bundling window can be configured by grouping three slots starting from slot n–5. For example, slot n–5, slot n–4, and slot n–3 can be included in bundling window #A, and slot n–2, slot n–1, and slot n can be included in bundling window #B. Therefore, one bundled HARQ-ACK bit can be generated by grouping the PDSCHs included in the bundling window #A, and one bundled HARQ-ACK bit can be generated by grouping the PDSCHs included in the bundling window #B.

Hereinafter, a method of generating the Type-1 HARQ-ACK codebook by the user equipment when time domain bundling is configured will be described. For explanation, in the present invention, it is assumed that the user equipment has generated a group in which PDSCHs are grouped based on the first information, second information, and third information. For convenience, the PDSCHs included in each group are denoted by {PDSCH #n, PDSCH #(n+i), . . . , PDSCH #(n+k–1)}. The number of PDSCHs included in each group is k.

In the present invention, the user equipment can select one of the PDSCHs included in the group as a representative. In this case, the user equipment can generate the Type-1 HARQ-ACK codebook based on the SLIV corresponding to the PDSCH. A method of selecting a representative from among the PDSCHs included in the group can include at least one of the following.

In the first method, the earliest PDSCH in time (e.g., of the first slot) among the PDSCHs included in the group can be selected as the representative. For example, if the PDSCHs included in the group are {PDSCH #n, PDSCH #(n+1), . . . , PDSCH #(n+k−1)}, PDSCH #n can be selected as the representative.

In the second method, the PDSCH farthest in time (e.g., of the last slot) among the PDSCHs included in the group can be selected as the representative. For example, if the PDSCHs included in the group are {PDSCH #n, PDSCH #(n+1), . . . , PDSCH #(n+k−1)}, PDSCH #(n+k−1) can be selected as the representative.

In the third method, the PDSCH occupying the most symbols among the PDSCHs included in the group can be selected as the representative. If a plurality of PDSCHs occupy the same number of symbols, the earliest PDSCH or furthest PDSCH in time among the PDSCHs can be selected as the representative.

In the fourth method, the PDSCH occupying the fewest symbols among the PDSCHs included in the group can be selected as the representative. If a plurality of PDSCHs occupy the same number of symbols, the earliest PDSCH or furthest PDSCH in time among the PDSCHs can be selected as the representative.

In the fifth method, among the PDSCHs in the first method, second method, third method, and fourth method, PDSCHs that overlap with at least one symbol with a symbol configured as a UL according to the semi-static UL/DL configuration can be excluded.

Figure 22:
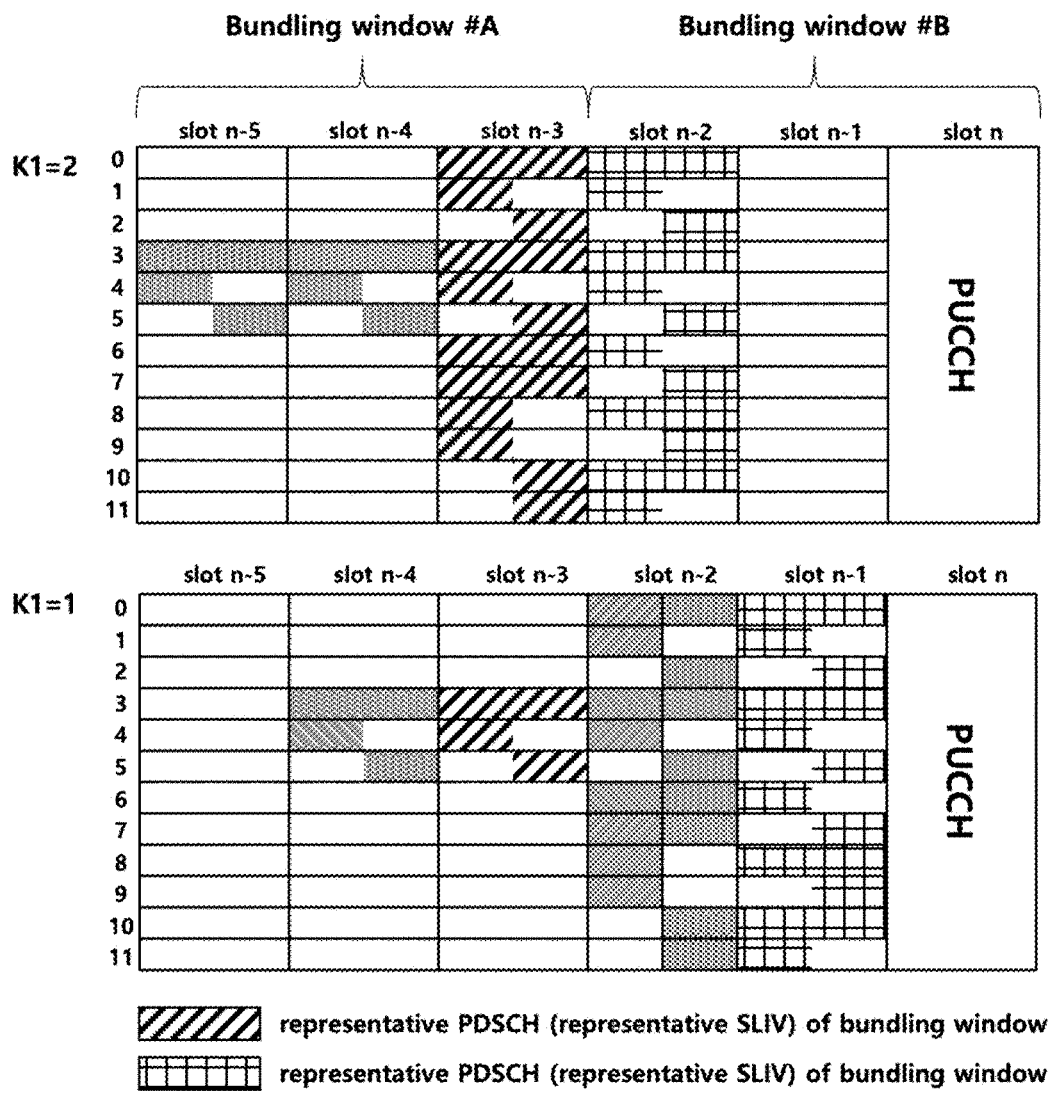
FIG. 22 illustrates a representative PDSCH according to the time domain bundling window.

Referring to FIG. 22, it is assumed that $N_{slot}=3$ is configured for the user equipment according to the second information. Here, k=n−5. That is, a bundling window can be configured by grouping three slots starting from slot n−5. For example, slot n−5, slot n−4, and slot n−3 can be included in bundling window #A, and slot n−2, slot n−1, and slot n can be included in bundling window #B. The user equipment can select the latest PDSCH candidate in time among the PDSCH candidates in the bundling window as a representative PDSCH (representative SLIV). For example, if the K1 value is 2, and TDRA index (or entry)=3, 4 PDSCH candidates can be scheduled in slot n−5, slot n−4, slot n−3, and slot n−2. Among the PDSCH candidates, the previous three PDSCH candidates (PDSCH candidates scheduled in slot n−5, slot n−4, and slot n−3) belong to bundling window #A. Therefore, the PDSCH candidate in slot n−3, which is a latest PDSCH candidate in time among the PDSCH candidates, can be selected as the representative PDSCH (representative SLIV). And, one PDSCH candidate (i.e., the PDSCH candidate scheduled in slot n−2) belongs to bundling window #B. Therefore, the PDSCH candidate in slot n−2, which is the latest PDSCH candidate in time among the PDSCH candidates, can be selected as the representative PDSCH (representative SLIV). The representative PDSCH (representative SLIV) selected in this way is shown in FIG. 22.

In the following description, the selected PDSCH (corresponding SLIV) is referred to as the representative PDSCH (or representative SLIV). One representative PDSCH (or representative SLIV) is determined for each group. The user equipment can generate a Type-1 HARQ-ACK codebook based on the representative SLIV as follows.

1) Stage 1: A set of K1 values that can be indicated to the user equipment is referred to as K1_set. Based on the K1_set and the TDRA table, the user equipment can determine the index of the slot in which the representative PDSCH candidate (representative SLIV candidate) is received. In this case, let the set of indexes of slots in which the representative PDSCH candidate (representative SLIV candidate) is received be K_slot.

2) Stage 2: The largest K1 value (hereinafter K1_max) is taken out from K_slot. Thereafter, the K1_max value is excluded from K_slot.

3) Stage 3: Let a set of representative PDSCH candidates (or representative SLIV candidates) that can be received in slot n−K1_max be R. If the symbols of the representative PDSCH candidate (or representative SLIV candidate) included in the set R overlaps with a symbol configured as UL by at least one symbol in the semi-static UL/DL configuration, the representative PDSCH candidate (representative SLIV candidate) is excluded from the set R.

Representative PDSCH candidates (or representative SLIV candidates) included in the set R can be obtained as follows. One K1 value can be selected from K1_set. Let the selected K1 value be K1_a. Based on the K1_a value and the TDRA table, the user equipment can determine the representative PDSCH candidate (or representative SLIV candidate) in slot n−K1_max.

4) Stage 4: The user equipment performs steps A and B on representative PDSCH candidates (or representative SLIV candidates) included in the set R.

Step A: Among the representative PDSCH candidates (representative SLIV candidates) of the set R, a new HARQ-ACK occasion is allocated to the representative PDSCH candidate (representative SLIV candidate) whose last symbol is the earliest. And in the set R, if there is a representative PDSCH candidate(s) (representative SLIV candidate(s)) overlaps with the representative PDSCH candidate (representative SLIV candidate) whose last symbol is the earliest/most preceding by at least one symbol, the same HARQ-ACK occasion is allocated to the representative PDSCH candidate(s) (representative SLIV candidate(s)). Representative PDSCH candidate(s) (representative SLIV candidate(s)) allocated a HARQ-ACK occasion (i.e., (i) the representative PDSCH candidate (representative SLIV candidate) whose last symbol is the earliest and (ii) the representative PDSCH candidate(s) (representative SLIV candidate) that overlaps with at least one symbol with that representative PDSCH candidate (representative SLIV candidate)) are excluded from the set R.

Step B: Step A is repeated until the set R becomes an empty set.

5) Stage 5: Stages 2/3/4 are repeated until K_slot becomes an empty set.

6) Stage 6: The user equipment can allocate B HARQ-ACK bits to candidates of representative PDSCHs (or, representative SLIV candidate) to which the same HARQ-ACK occasion is allocated. Here, B is the maximum value among the number of PDSCHs included in the group that includes candidates of representative PDSCHs (or, representative SLIV candidate) to which the same HARQ-ACK occasion is allocated.

Figure 23:
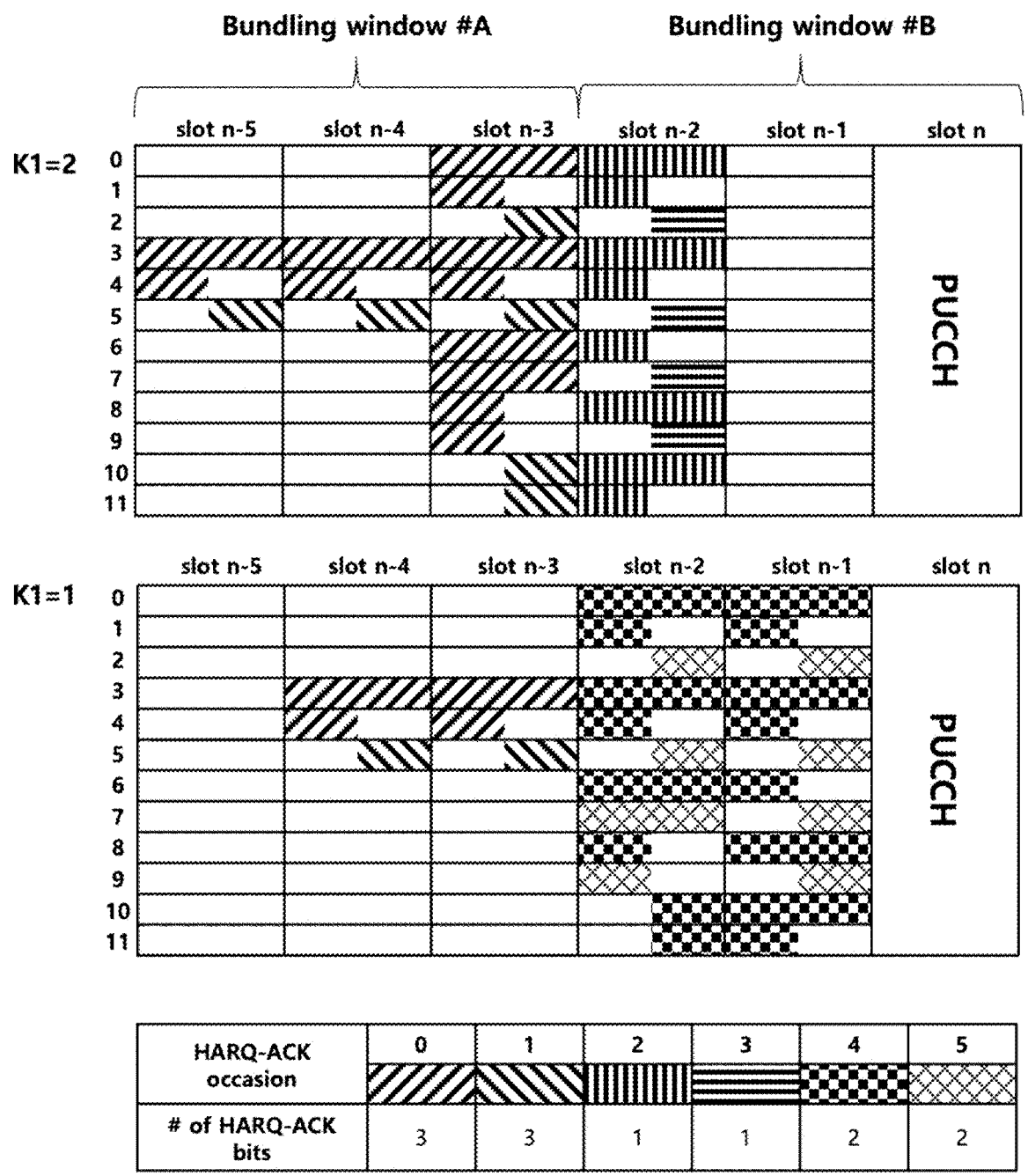
FIG. 23 illustrates the HARQ-ACK occasion according to the time domain bundling window.

Description will be made in more detail with reference to FIG. 23. First, it is assumed that the user equipment has determined the representative PDSCH candidates (representative SLIV candidates) according to FIG. 22.

1) Stage 1: For the user equipment, 1 and 2 are configured as K1 values, and thus K1_set={1,2}. When the K1 value is 2, the representative PDSCH candidate (or representative SLIV candidate) is located in slot n−3 and slot n−2. Therefore, the K1 values of the slot are 3 and 2. Both values can be included in K_slot. Further, when the K1 value is 1, the representative PDSCH candidate (or representative SLIV candidate) is located in slot n−3 and slot n−1. Therefore, the K1 values of the slot are 3 and 1. Both values can be included in K_slot. Therefore, when K1_set={1,2} is configured, K_slot is {1,2,3} as the union of the two.

2) Stage 2: K1_max=3, which is the largest value in K_slot, is selected. Thereafter, the K1_max value is excluded from K_slo.

3) Stage 3: Let the set of representative PDSCH candidates (or representative SLIV candidates) that can be received in slot n−K1_max=n−3 be R. If the symbols of the representative PDSCH candidate (or representative SLIV candidate) included in the set R overlaps with a symbol configured as UL by at least one symbol in the semi-static UL/DL configuration, the representative PDSCH candidate (or, representative SLIV candidate) is excluded from the set R. For convenience of explanation, in this example, it is assumed that all symbols in the slot are downlink symbols.

Representative PDSCH candidates (or representative SLIV candidates) included in the set R in slot n−3 are R={(S=0, L=14), (S=0, L=7), (S=7, L=7)}.

4) Stage 4: The user equipment performs Step A and Step B for the representative PDSCH candidates (representative SLIV candidates) included in the set R.

Step A: Among the representative PDSCH candidates of the set R, HARQ-ACK occasion 0 is allocated to the representative PDSCH candidate (representative SLIV candidate) (S=0, L=7) whose last symbol is the earliest. And, in the set R, the same HARQ-ACK occasion is allocated to the representative PDSCH candidate (representative SLIV candidate) (S=0, L=14) that overlaps with the representative PDSCH candidate (representative SLIV candidate) (S=0, L=7) whose last symbol is the earliest by at least one symbol. The representative PDSCH candidates (representative SLIV candidates) (S=0, L=7) and (S=0, L=14) to which the HARQ-ACK occasion is allocated are excluded from the set R. Therefore, the set R={(S=7, L=7)}.

Step B: Step A is repeated until the set R becomes an empty set. In this example, since the set R is not the empty set, step A is repeated. According to step A, HARQ-ACK occasion 1 is allocated to the representative PDSCH candidate (or representative SLIV candidate) (S=7, L=7), and the set R becomes an empty set. Therefore, Stage 4 ends.

5) Stage 5: Stages 2/3/4 are repeated until K_slot becomes an empty set. In the example, K_slot={2, 1}, and thus is not an empty set. Since K_slot is not an empty set, stages 2/3/4 are repeated.

According to the above stages, PDSCH candidates and HARQ-ACK occasions are determined as follows.

HARQ-ACK Occasion 0: Representative PDSCH candidate of slot n−3 (S=0, L=7), (S=0, L=14)

HARQ-ACK Occasion 1: Representative PDSCH candidate of slot n−3 (S=7, L=7)

HARQ-ACK Occasion 2: Representative PDSCH candidate of slot n−2 (S=0, L=7), (S=0, L=14)

HARQ-ACK Occasion 3: Representative PDSCH candidate of slot n−2 (S=7, L=7)

HARQ-ACK Occasion 4: Representative PDSCH candidate of slot n−1 (S=0, L=7), (S=0, L=14)

HARQ-ACK Occasion 5: Representative PDSCH candidate of slot n−1 (S=7, L=7)

Therefore, the Type-1 HARQ-ACK codebook can consist of 6 HARQ-ACK occasions.

6) Stage 6: The user equipment can determine the number of HARQ-ACK bit(s) per HARQ-ACK occasion as follows. Representative PDSCH candidates included in HARQ-ACK occasion 0 are (S=0, L=7), (S=0, L=14), and the TDRA indices (or entries) to which the representative PDSCH candidates belong within the bundling window are 0, 1, 3, 4, 6, 7, 8, 9 when K1=2, and 3 and 4 when K1=1. Among these, when K1=2 and the TDRA index is 3, the most 3 PDSCH candidates exist within the bundling window, and thus HARQ-ACK occasion 0 includes three HARQ-ACK bits. In the same way, HARQ-ACK occasion 1 can include three HARQ-ACK bits, HARQ-ACK occasion 2 can include one HARQ-ACK bit, HARQ-ACK occasion 3 can include one HARQ-ACK bit, HARQ-ACK occasion 4 can include two HARQ-ACK bits, and HARQ-ACK occasion 5 can include two HARQ-ACK bits.

Therefore, the Type-1 HARQ-ACK codebook can include a total of 12 HARQ-ACK bits.

Type-2 (or Dynamic) HARQ-ACK Codebook

For the user equipment, a dynamic HARQ-ACK codebook can be configured. When the dynamic HARQ-ACK codebook is used, the base station can signal information necessary for generating the HARQ-ACK codebook through PDCCH (or DCI). Specifically, the base station can signal information necessary for HARQ-ACK codebook generation through a downlink assignment index (DAI) field of PDCCH (or DCI). Specifically, the DAI can indicate i) the number of bits of the HARQ-ACK codebook, and/or ii) information about the location of the HARQ-ACK bit corresponding to the DAI within the HARQ-ACK codebook. Here, the HARQ-ACK bit corresponding to the DAI may mean (i) the HARQ-ACK bit for the PDSCH scheduled by the DAI, or (ii) the HARQ-ACK bit for the DAI. The DAI can be divided into a counter-DAI and a total-DAI. The user equipment can determine the number of bits of the dynamic HARQ-ACK codebook based on the DAI of the PDCCH (or DCI).

Meanwhile, the Type-2 HARQ-ACK codebook can be composed of two sub-codebooks. Information needed to construct each sub-codebook (e.g., sub-codebook size (e.g., number of bits), HARQ-ACK bit location within the sub-codebook) can be obtained based on DAI information within each DCI.

The first sub-codebook includes HARQ-ACK bit(s) of PDSCHs according to TB-based transmission. Here, PDSCHs are respectively scheduled by each DCI. That is, one PDSCH is scheduled by one DCI (hereinafter, single-PDSCH scheduling). Further, if the PDSCHs according to TB-based transmission are configured to include one TB, one HARQ-ACK bit can be generated per PDSCH, and if the PDSCHs according to TB-based transmission are configured to include two TBs in at least one cell (and if spatial bundling is not configured), two HARQ-ACK bits can be generated per PDSCH. Therefore, (if spatial bundling is not configured) P HARQ-ACK bit(s) can be generated per DCI scheduling TB-based transmission. Here, P is the maximum number of TBs included in the PDSCH. For reference, if the number of TBs scheduled by DCI is less than P, the HARQ-ACK bit (i.e., unscheduled TB) corresponding to the insufficient number of TBs is configured as NACK.

The second sub-codebook includes HARQ-ACK bit(s) of PDSCHs according to code block group (CBG)-based transmission. For the user equipment, configuration can be made such that the PDSCH according to CBG-based transmission in cell c includes (maximum) $N_{CBG,c}$ CBGs per TB. For all cells for which CBG-based transmission is configured, let the maximum value of ((maximum) TB number of cell c)*$N_{CBG,c}$ be $N_{CBG,max}$. The user equipment generates $N_{CBG,max}$ HARQ-ACK bit(s) per DCI scheduling the CBG-based transmission. For reference, if the number of CBGs scheduled by DCI is less than $N_{CBG,max}$, the HARQ-ACK bit(s) corresponding to the insufficient number of CBGs is configured as NACK.

Hereinafter, description will be made on a method of generating a Type-2 HARQ-ACK (sub-) codebook when a plurality of PDSCHs are scheduled with one DCI (i.e., multi-slot scheduling; multi-PDSCH scheduling). For convenience of explanation, in the description below, the second sub-codebook is described as including both a CBG-based HARQ-ACK bit and a multi-PDSCH scheduling-based HARQ-ACK bit. However, this is an example, and in an actual wireless communication environment, depending on the scheduling situation, the second sub-codebook can include only the multi-PDSCH scheduling-based HARQ-ACK bit. In the first method, when a plurality of PDSCHs are scheduled with one DCI, the HARQ-ACK of the multi-PDSCHs can always be transmitted in the second sub-codebook. Here, the second sub-codebook can be modified as follows.

The second sub-codebook includes (i) HARQ-ACK bit(s) of PDSCHs according to CBG-based transmission and (ii) HARQ-ACK bit(s) of a plurality of PDSCHs when the plurality of PDSCHs are scheduled with one DCI. For the user equipment, configuration can be made such that the PDSCH according to CBG-based transmission for cell c to include (maximum) $N_{CBG,c}$ CBGs per TB. For all cells for which CBG-based transmission is configured, let the maximum value of ((maximum) TB number of cell c)*$N_{CBG,c}$ be $N_{CBG,max}$. Further, let the largest value among the number of PDSCHs scheduled by one TDRA index when a plurality of PDSCHs are scheduled with one DCI be $N_{multi\text{-}PDSCH,max}$.

The user equipment can generate max($N_{CBG,max}$, $N_{multi\text{-}PDSCH,max}$) HARQ-ACK bit(s) per DCI indicating CBG-based transmission. The user equipment can generate max($N_{CBG,max}$, $N_{multi\text{-}PDSCH,max}$) HARQ-ACK bit(s) for the DCI indicating multi-PDSCH scheduling. If the number of CBGs scheduled by DCI is less than max($N_{CBG,max}$, $N_{multi\text{-}PDSCH,max}$), the HARQ-ACK bit(s) corresponding to the insufficient number of (CBGs) is configured as NACK. If the number of PDSCHs scheduled by the DCI indicating multi-PDSCH scheduling is less than max($N_{CBG,max}$, $N_{multi\text{-}PDSCH,max}$), the HARQ-ACK bit(s) corresponding to the insufficient number of (PDSCHs) is configured as NACK.

In the second method, when a plurality of PDSCHs are scheduled with one DCI, the user equipment can selectively transmit HARQ-ACK of multi-PDSCHs through the first sub-codebook or the second sub-codebook according to the number of PDSCHs. Here, the first sub-codebook and the second sub-codebook can be modified as follows.

The first sub-codebook can include (i) HARQ-ACK bit(s) of PDSCHs according to TB-based transmission and (ii) the HARQ-ACK bit(s) of a plurality of PDSCHs if the number of PDSCHs is X or less when the PDSCHs are scheduled with one DCI (i.e., multi-PDSCH). Here, it is assumed that the PDSCHs according to TB-based transmission are configured to include P number of TBs. Here, P is the maximum number of TBs included in the PDSCH. Accordingly, max{P, X} HARQ-ACK bit(s) can be generated per DCI scheduling TB-based transmission. For reference, if the number of TBs scheduled by DCI is less than max{P, X}, the HARQ-ACK bit(s) corresponding to the insufficient number of (PDSCH) is configured as NACK. For reference, the DCI that indicates multi-PDSCH scheduling schedules X or less PDSCHs. If the number of PDSCHs scheduled by the DCI that indicates multi-PDSCH scheduling is less than max{P, X}, the HARQ-ACK bit(s) corresponding to the insufficient number of (PDSCHs) is configured as NACK.

The second sub-codebook includes (i) HARQ-ACK bit(s) of PDSCHs according to CBG-based transmission, and (ii) HARQ-ACK bit(s) of a plurality of PDSCHs if the number of PDSCHs exceeds X when the plurality of PDSCHs are scheduled with DCI. For the user equipment, configuration can be made such that the PDSCH according to CBG-based transmission for cell c includes (maximum) $N_{CBG,c}$ CBGs per TB. For all cells for which CBG-based transmission is configured, let the maximum value of (maximum) TB number of cell c)*$N_{CBG,c}$ be $N_{CBG,max}$. Let the largest value among the number of PDSCHs scheduled by one TDRA index when a plurality of PDSCHs are scheduled with DCI be $N_{multi\text{-}PDSCH,max}$. For reference, $N_{multi\text{-}PDSCH,max}$ is a value larger than X.

The user equipment generates max($N_{CBG,max}$, $N_{multi\text{-}PDSCH,max}$) HARQ-ACK bit(s) per DCI indicating CBG-based transmission. The user equipment generates max($N_{CBG,max}$, $N_{multi\text{-}PDSCH,max}$) HARQ-ACK bit(s) for the DCI indicating multi-PDSCH scheduling. If the number of CBGs scheduled by DCI is less than max($N_{CBG,max}$, $N_{multi\text{-}PDSCH,max}$), the HARQ-ACK bit(s) corresponding to the insufficient number of (CBGs) is configured as NACK. If the number of PDSCHs scheduled by the DCI indicating multi-PDSCH scheduling is less than max($N_{CBG,max}$, $N_{multi\text{-}PDSCH,max}$), the HARQ-ACKs bit(s) corresponding to the insufficient number of (PDSCH) is configured as NACK.

As previously, it can be preferably set as X=P. That is, if the multi-PDSCH scheduling DCI schedules PDSCHs less than or equal to P PDSCHs, the HARQ-ACK of the multi-PDSCHs is included in the first sub-codebook, and if the multi-PDSCH scheduling DCI schedules more than P PDSCHs, the HARQ-ACK of the multi-PDSCHs is included in the second sub-codebook.

The second method can be modified as follows when the Type-2 HARQ-ACK codebook and time domain bundling are configured simultaneously. Time domain bundling is as described above.

In the modified second method, when a plurality of PDSCHs are scheduled with one DCI, the user equipment can selectively transmit HARQ-ACK of multi-PDSCHs through the first sub-codebook or the second sub-codebook in accordance with the number of bundled HARQ-ACK bit(s) according to DCI. The number of bundled HARQ-ACK bit(s) is determined according to the number of PDSCH/bundling groups. Here, the first sub-codebook and the second sub-codebook can be modified as follows.

The first sub-codebook includes (i) HARQ-ACK bit(s) of PDSCHs according to TB-based transmission, and (ii) the bundled HARQ-ACK bit(s) if the bundled HARQ-ACK according to DCI is less than or equal to X bit(s) when a plurality of PDSCHs are scheduled with one DCI. Here, it is assumed that PDSCHs according to TB-based transmission are configured to include (maximum) P TBs. Here, P is the maximum number of TBs included in the PDSCH. Accordingly, max{P, X} HARQ-ACK bit(s) can be generated per DCI scheduling TB-based transmission. For reference, if the number of TB scheduled by DCI is less than max{P, X}, the HARQ-ACK bit(s) corresponding to the insufficient number of (TBs) is configured as NACK. max{P, X} bundled HARQ-ACK bit(s) can be generated per DCI scheduling TB-based transmission. For reference, the DCI indicating multi-PDSCH scheduling corresponds to X bit(s) or less bundled HARQ-ACK bit(s). If the number of bundled HARQ-ACK bit(s) corresponding to the DCI indicating multi-PDSCH scheduling is less than max{P, X}, the bundled HARQ-ACK bit(s) corresponding to the insufficient number (PDSCHs) is configured as NACK.

The second sub-codebook includes (i) HARQ-ACK of PDSCHs according to CBG-based transmission and (ii) the bundled HARQ-ACK bit(s) if the bundled HARQ-ACK according to DCI exceeds X bits when a plurality of PDSCHs are scheduled with DCI. For the user equipment, configuration can be made such that the PDSCH according to CBG-based transmission for cell c includes (maximum) $N_{CBG,c}$ CBGs per TB. For all cells for which CBG-based transmission is configured, let the maximum value of (maximum) TB number of cell c)*$N_{CBG,c}$ be $N_{CBG,max}$. Let the largest value among the number of bundled HARQ-ACK bit(s) corresponding to one TDRA index when multiple PDSCHs are scheduled with DCI be $N_{bundled,max}$. For reference, $N_{bundled,max}$ is a value larger than X.

The user equipment can generate max($N_{CBG,max}$, $N_{bundled,max}$) HARQ-ACK bit(s) per DCI indicating the CBG-based transmission. The user equipment generates max($N_{CBG,max}$, $N_{bundled,max}$) HARQ-ACK bit(s) for the DCI indicating multi-PDSCH scheduling. If the number of CBGs scheduled by DCI is less than max($N_{CBG,max}$, $N_{bundled,max}$), the HARQ-ACK bit(s) corresponding to the insufficient number of (CBGs) is configured as NACK. If the number of bundled HARQ-ACK bit(s) corresponding to DCI indicating multi-PDSCH scheduling is less than max($N_{CBG,max}$, $N_{bundled,max}$), the bundled HARQ-ACK bit(s) corresponding to the insufficient number is configured as NACK.

For example, it is assumed that the user equipment always generates one bundled HARQ-ACK bit for the DCI indicating multi-PDSCH scheduling. For example, this corresponds to the case where the number of PDSCH/bundling groups for time domain bundling is configured as 1. In this case, the bundled HARQ-ACK bits can be included in the first sub-codebook (e.g., X=1). In other cases (e.g., when the number of PDSCH/bundling groups for time domain bundling is plural), the bundled HARQ-ACK bits can be included in the second sub-codebook.

Figure 24:
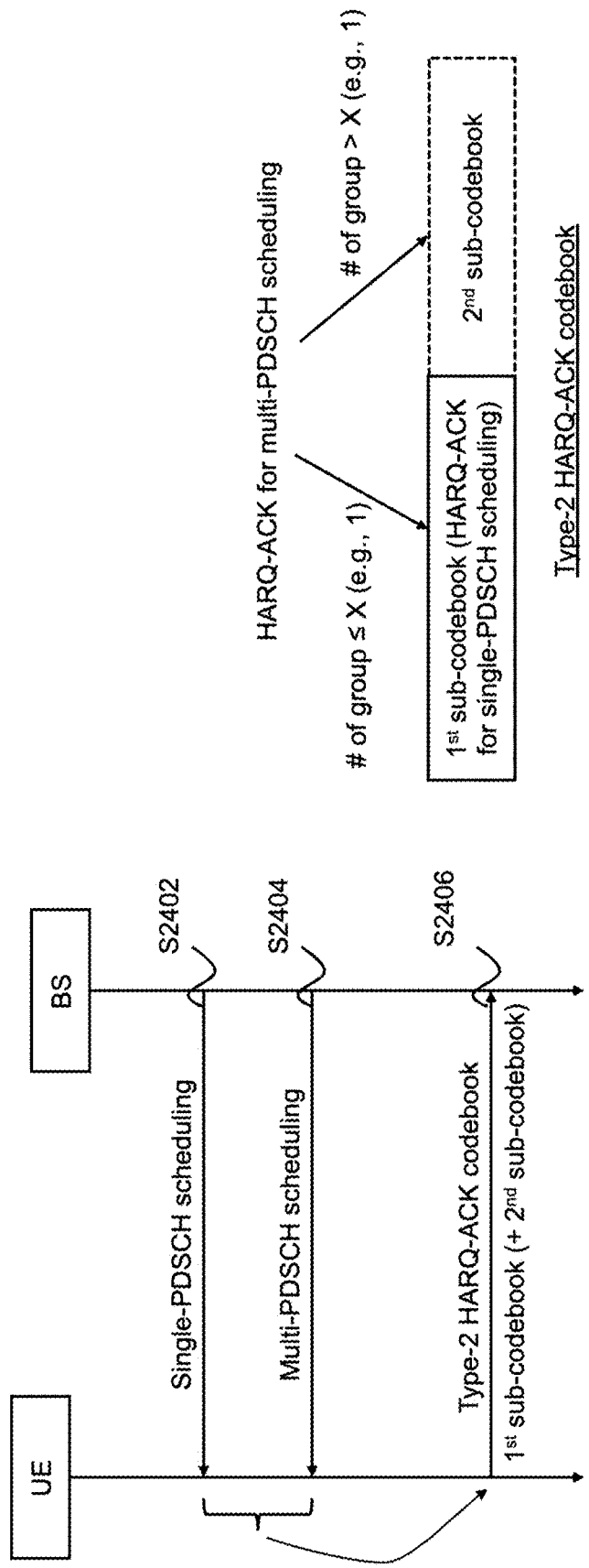
FIG. 24 illustrates an HARQ-ACK transmission process according to an example of the present invention.

FIG. 24 illustrates a HARQ-ACK codebook transmission process according to an example of the present invention.

Referring to FIG. 24, the user equipment can receive single-PDSCH scheduling (S2402). Further, the user equipment can receive multi-PDSCH scheduling (S2404). Here, it is assumed that TB-based HARQ-ACK feedback is applied to single/multi-PDSCH scheduling, respectively. The user equipment can generate and transmit a Type-2 HARQ-ACK codebook including HARQ-ACK information for single/multi-PDSCH scheduling (S2406). The Type-2 HARQ-ACK codebook includes a first sub-codebook and can additionally include a second sub-codebook.

Here, the first sub-codebook includes TB-based HARQ-ACK information for single-PDSCH scheduling. TB-based HARQ-ACK information for multi-PDSCH scheduling can be included in the first sub-codebook or composed of the second sub-codebook based on the number of bundled HARQ-ACK bits. For example, if the number of PDSCH/bundling groups for multi-PDSCH scheduling is X or less (e.g., X=1), TB-based HARQ-ACK information for multi-PDSCH scheduling can be included in the first sub-codebook. On the other hand, when the number of PDSCH/bundling groups for multi-PDSCH scheduling exceeds X, TB-based HARQ-ACK information for multi-PDSCH scheduling can be composed of the second sub-codebook. The second sub-codebook is concatenated behind the first sub-codebook.

Figure 25:
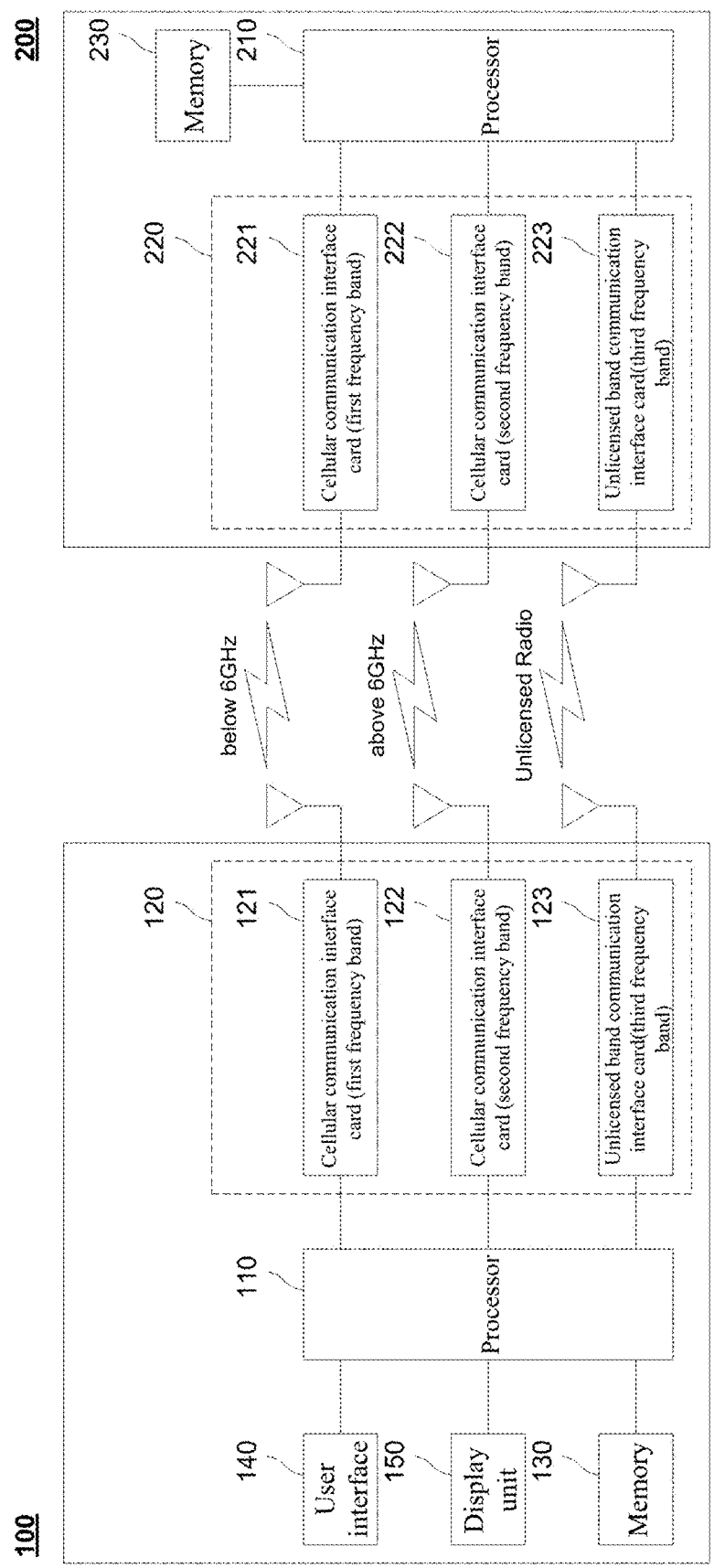
FIG. 25 is a block diagram showing the configurations of a UE and a base station according to an embodiment of the present disclosure.

FIG. 25 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 25 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as a single type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent

49 concepts should be interpreted as being included in the scope of the present disclosure.

The present invention can be applied to wireless communication systems. Specifically, the present invention can be used in a communication method and device for the same used in a wireless communication system.

What is claimed is:

1. A user equipment for use in a wireless communication system, the user equipment comprising:
a communication module; and
a processor that controls the communication module,
wherein the processor is configured to:
receive a physical downlink control channel (PDCCH) having the following information:
index information indicating one entry in a time-domain resource allocation (TDRA) table for physical downlink shared channel (PDSCH) allocation, and
timing information indicating one value in a K1-set $\{K1_i\}$ (i represents an index of element) for PDSCH-to-hybrid automatic repeat and request (HARQ) slot timing;
determine a PDSCH candidate set of slot n-K1$_i$ for all K1 values in the K1-set, wherein slot n is indicated using the timing information; and
transmit a semi-static HARQ-ACK codebook in the slot n, based on the determined PDSCH candidate set of each slot,
wherein when determining the PDSCH candidate set, the K1-set is replaced by a union of 'the K1-set $\{K1_i\}$+ $\{d_k\}$' based on at least one entry in the TDRA table being associated with a plurality of PDCCH-to-PDSCH slot timing K0 values, and
wherein, $d_k$ (k represents an index of element) corresponds to a slot index difference between a slot to which a last PDSCH can be allocated and a slot to which a k-th PDSCH can be allocated based on the plurality of PDCCH-to-PDSCH timing K0 values, across all entries in the TDRA table.

2. The user equipment of claim 1, wherein a subcarrier spacing (SCS) applied to a slot in which the PDCCH is transmitted and the SCS applied to a slot in which the semi-static HARQ-ACK codebook is transmitted are the same.

3. The user equipment of claim 1, wherein, as for the determined PDSCH candidate set of each slot, a plurality of HARQ-ACK occasions are sequentially allocated to PDSCH candidates that do not overlap with reference to a PDSCH candidate with an earliest last symbol, and the semi-static HARQ-ACK codebook is configured based on the plurality of HARQ-ACK occasions.

4. The user equipment of claim 3, wherein when a time domain bundling is applied to the semi-static HARQ-ACK codebook, the plurality of HARQ-ACK occasions are allocated based on the PDSCH candidate set of the slot to which the last PDSCH can be allocated per each bundling group based on each entry in the TDRA table.

5. The user equipment of claim 1, wherein the wireless communication system includes a 3rd generation partnership project (3GPP) new radio (NR)-based wireless communication system.

6. A method for use by a user equipment in a wireless communication system, the method comprising:
receiving a physical downlink control channel (PDCCH) having the following information:
index information indicating one entry in a time-domain resource allocation (TDRA) table for physical downlink shared channel (PDSCH) allocation, and

50 timing information indicating one value in a K1-set $\{K1_i\}$ (i represents an index of element) for PDSCH-to-hybrid automatic repeat and request (HARQ) slot timing;
determining a PDSCH candidate set of slot n-K1$_i$; for all K1 values in the K1-set, wherein slot n is indicated using the timing information; and
transmitting a semi-static HARQ-ACK codebook in the slot n, based on the determined PDSCH candidate set of each slot,
wherein when determining the PDSCH candidate set, the K1-set is replaced by a union of 'the K1-set $\{K1_i\}$+ $\{d_k\}$' based on at least one entry in the TDRA table being associated with a plurality of PDCCH-to-PDSCH slot timing K0 values, and
wherein dk (k represents an index of element) corresponds to a slot index difference between a slot to which a last PDSCH can be allocated and a slot to which a k-th PDSCH can be allocated based on the plurality of PDCCH-to-PDSCH timing K0 values, across all entries in the TDRA table.

7. The method of claim 6, wherein a subcarrier spacing (SCS) applied to a slot in which the PDCCH is transmitted and the SCS applied to a slot in which the semi-static HARQ-ACK codebook is transmitted are the same.

8. The method of claim 6, wherein, as for the determined PDSCH candidate set of each slot, a plurality of HARQ-ACK occasions are sequentially allocated to PDSCH candidates that do not overlap with reference to a PDSCH candidate with an earliest last symbol, and the semi-static HARQ-ACK codebook is configured based on the plurality of HARQ-ACK occasions.

9. The method of claim 8, wherein when a time domain bundling is applied to the semi-static HARQ-ACK codebook, the plurality of HARQ-ACK occasions are allocated based on the PDSCH candidate set of the slot to which the last PDSCH can be allocated per each bundling group based on each entry in the TDRA table.

10. The method of claim 6, wherein the wireless communication system includes a 3rd generation partnership project (3GPP) new radio (NR)-based wireless communication system.

11. A base station for use in a wireless communication system, the base station comprising:
a communication module; and
a processor that controls the communication module,
wherein the processor is further configured to:
transmit a physical downlink control channel (PDCCH) having the following information:
index information indicating one entry in a time-domain resource allocation (TDRA) table for physical downlink shared channel (PDSCH) allocation, and
timing information indicating one value in a K1-set $\{K1_i\}$ (i represents an index of element) for PDSCH-to-hybrid automatic repeat and request (HARQ) slot timing;
determine a PDSCH candidate set of slot n-K1$_i$ for all K1 values in the K1-set, wherein slot n is indicated using the timing information; and
receive a semi-static HARQ-ACK codebook in the slot n, based on the determined PDSCH candidate set of each slot,
wherein when determining the PDSCH candidate set, the K1-set is replaced by a union of 'the K1-set $\{K1_i\}$+ $\{d_k\}$' based on at least one entry in the TDRA table being associated with a plurality of PDCCH-to-PDSCH slot timing K0 values, and wherein $d_k$ (k represents an index of element) corresponds to a slot index difference between a slot to which a last PDSCH can be allocated and a slot to which a k-th PDSCH can be allocated based on the plurality of PDCCH-to-PDSCH timing K0 values, across all entries in the TDRA table.

12. The base station of claim 11, wherein a subcarrier spacing (SCS) applied to a slot in which the PDCCH is transmitted and the SCS applied to a slot in which the semi-static HARQ-ACK codebook is transmitted are the same.

13. The base station of claim 11, wherein, as for the determined PDSCH candidate set of each slot, a plurality of HARQ-ACK occasions are sequentially allocated to PDSCH candidates that do not overlap with reference to a PDSCH candidate with an earliest last symbol, and the semi-static HARQ-ACK codebook is configured based on the plurality of HARQ-ACK occasions.

14. The base station of claim 13, wherein when a time domain bundling is applied to the semi-static HARQ-ACK codebook, the plurality of HARQ-ACK occasions are allocated based on the PDSCH candidate set of the slot to which the last PDSCH can be allocated per each bundling group based on each entry in the TDRA table.

15. The base station of claim 11, wherein the wireless communication system includes a 3rd generation partnership project (3GPP) new radio (NR)-based wireless communication system.

16. A method for use by a base station in a wireless communication system, the method comprising:
   transmitting a physical downlink control channel (PDCCH) having the following information:
   index information indicating one entry in a time-domain resource allocation (TDRA) table for physical downlink shared channel (PDSCH) allocation, and
   timing information indicating one value in a K1_set $\{K1_i\}$ (i represents an index of element) for PDSCH-to-hybrid automatic repeat and request (HARQ) slot timing;
   determining a PDSCH candidate set of slot n−K1$_j$ for all K1 values in the K1-set, wherein slot n is indicated using the timing information; and
   receiving a semi-static HARQ-ACK codebook in the slot n, based on the determined PDSCH candidate set of each slot,
   wherein when determining the PDSCH candidate set, the K1-set is replaced by a union of 'the K1-set $\{k1_i\}$ + $\{d_K\}$' based on at least one entry in the TDRA table being associated with a plurality of PDCCH-to-PDSCH slot timing K0 values, and
   wherein, $d_k$ (k represents an index of element) corresponds to a slot index difference between a slot to which a last PDSCH can be allocated and a slot to which a k-th PDSCH can be allocated based on the plurality of PDCCH-to-PDSCH timing K0 values, across all entries in the TDRA table.

17. The method of claim 16, wherein a subcarrier spacing (SCS) applied to a slot in which the PDCCH is transmitted and the SCS applied to a slot in which the semi-static HARQ-ACK codebook is transmitted are the same.

18. The method of claim 16, wherein, as for the determined PDSCH candidate set of each slot, a plurality of HARQ-ACK occasions are sequentially allocated to PDSCH candidates that do not overlap with reference to a PDSCH candidate with an earliest last symbol, and the semi-static HARQ-ACK codebook is configured based on the plurality of HARQ-ACK occasions.

19. The method of claim 18, wherein when a time domain bundling is applied to the semi-static HARQ-ACK codebook, the plurality of HARQ-ACK occasions are allocated based on the PDSCH candidate set of the slot to which the last PDSCH can be allocated per each bundling group based on each entry in the TDRA table.

20. The method of claim 16, wherein the wireless communication system includes a 3rd generation partnership project (3GPP) new radio (NR)-based wireless communication system.

\* \* \* \* \*

UNITED STATES PATENT AND TRADEMARK OFFICE
CERTIFICATE OF CORRECTION

PATENT NO. : 12,081,348 B2
APPLICATION NO. : 18/374605
DATED : September 3, 2024
INVENTOR(S) : Kyungjun Choi et al.

Page 1 of 1

It is certified that error appears in the above-identified patent and that said Letters Patent is hereby corrected as shown below:

In the Claims

In Claim 1, Column 49, Line 29, "$\{K1_i;\}$" should be changed to "$\{K1_i\}$".
In Claim 1, Column 49, Line 32, "KO" should be changed to "K0".
In Claim 6, Column 50, Line 16, "dk" should be changed to "$d_k$".
In Claim 16, Column 51, Line 36, "K1_set" should be changed to "K1-set".
In Claim 16, Column 52, Line 8, "$\{k1_i\}$" should be changed to "$\{K1_i\}$".
In Claim 16, Column 52, Line 9, "$\{d_K\}$" should be changed to "$\{d_k\}$".

Signed and Sealed this
Twelfth Day of August, 2025

Coke Morgan Stewart
*Acting Director of the United States Patent and Trademark Office*